(12) United States Patent
Su et al.

(10) Patent No.: US 11,540,019 B2
(45) Date of Patent: Dec. 27, 2022

(54) VIDEO RECOMMENDATION METHOD AND DEVICE, COMPUTER DEVICE AND STORAGE MEDIUM

(71) Applicant: Tencent Technology (Shenzhen) Company Limited, Guangdong (CN)

(72) Inventors: Zhou Su, Shenzhen (CN); Shukai Liu, Shenzhen (CN); Zhenlong Sun, Shenzhen (CN); Jun Rao, Shenzhen (CN); Zhijie Qiu, Shenzhen (CN); Yi Liu, Shenzhen (CN); Qi Liu, Shenzhen (CN); Liangdong Wang, Shenzhen (CN); Tiantian Shang, Shenzhen (CN); Mingfei Liang, Shenzhen (CN); Lei Chen, Shenzhen (CN); Bo Zhang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 17/329,928

(22) Filed: May 25, 2021

(65) Prior Publication Data

US 2021/0281918 A1 Sep. 9, 2021

Related U.S. Application Data

(63) Continuation of application No. PCT/CN2020/081052, filed on Mar. 25, 2020.

(30) Foreign Application Priority Data

Apr. 23, 2019 (CN) .......................... 201910330212.9

(51) Int. Cl.
H04N 21/466 (2011.01)
H04N 21/25 (2011.01)
(Continued)

(52) U.S. Cl.
CPC ....... *H04N 21/4668* (2013.01); *G06K 9/6289* (2013.01); *G06N 3/08* (2013.01);
(Continued)

(58) Field of Classification Search
CPC ............. H04N 21/4668; H04N 21/251; H04N 21/44008; H04N 21/4666; G06V 20/46; G06K 9/6289; G06N 3/08
See application file for complete search history.

(56) References Cited

U.S. PATENT DOCUMENTS 9,633,119 B2    4/2017  Wexler
11,153,655 B1 * 10/2021  Germano ......... H04N 21/44222
(Continued)

FOREIGN PATENT DOCUMENTS

CN     103295016 A     9/2013
CN     106407418 A     2/2017
(Continued)

OTHER PUBLICATIONS

International Search Report and Written Opinion for priority application No. PCT/CN2020/081052 dated Jun. 16, 2020, 12p, in Chinese language.

(Continued)

*Primary Examiner* — Nnenna N Ekpo
(74) *Attorney, Agent, or Firm* — Crowell & Moring LLP

(57) ABSTRACT

A video recommendation method is provided, including: inputting a video to a first feature extraction network, performing feature extraction on at least one consecutive video frame in the video, and outputting a video feature of the video; inputting user data of a user to a second feature extraction network, performing feature extraction on the discrete user data, and outputting a user feature of the user; performing feature fusion based on the video feature and the user feature, and obtaining a recommendation probability of (Continued)

recommending the video to the user; and determining, according to the recommendation probability, whether to recommend the video to the user.

20 Claims, 11 Drawing Sheets

(51) Int. Cl.
  *H04N 21/44* (2011.01)
  *G06K 9/62* (2022.01)
  *G06N 3/08* (2006.01)
  *G06V 20/40* (2022.01)

(52) U.S. Cl.
  CPC .......... *G06V 20/46* (2022.01); *H04N 21/251* (2013.01); *H04N 21/44008* (2013.01); *H04N 21/4666* (2013.01)

(56) References Cited

U.S. PATENT DOCUMENTS

| | | | |
|---|---|---|---|
| 2015/0193540 A1* | 7/2015 | Wexler | G06F 16/9535 707/734 |
| 2017/0061286 A1 | 3/2017 | Kumar et al. | |
| 2019/0236680 A1* | 8/2019 | Kounine | G06N 20/00 |
| 2019/0354835 A1* | 11/2019 | Mac | G06V 20/46 |

FOREIGN PATENT DOCUMENTS

| | | |
|---|---|---|
| CN | 106682233 A | 5/2017 |
| CN | 107330115 A | 11/2017 |
| CN | 107544981 A | 1/2018 |
| CN | 107911719 A | 4/2018 |
| CN | 108243357 A | 7/2018 |
| CN | 108764317 A | 11/2018 |
| CN | 108833973 A | 11/2018 |
| CN | 109165350 A | 1/2019 |
| CN | 109547814 A | 3/2019 |
| CN | 110149541 A | 8/2020 |
| WO | WO 2017/219812 A1 | 12/2017 |
| WO | WO 2020/215962 A1 | 10/2020 |

OTHER PUBLICATIONS

English language translation of the International Search Report for priority application No. PCT/CN2020/081052 dated Jun. 16, 2020, 4p.

Search Report and First Office Action for Chinese application No. 201910330212.9 dated Mar. 1, 2021, 9p, in Chinese language.

Concise explanation of Relevance for International Written Opinion and Search Report and First Office Action for Chinese application No. 201910330212.9, 1p.

\* cited by examiner

VIDEO RECOMMENDATION METHOD AND DEVICE, COMPUTER DEVICE AND STORAGE MEDIUM

RELATED APPLICATIONS

This application is a continuation of PCT Application No. PCT/CN2020/081052, titled "VIDEO RECOMMENDATION METHOD AND DEVICE, COMPUTER DEVICE AND STORAGE MEDIUM" and filed with the China National Intellectual Property Administration on Mar. 25, 2020, which claims priority to Chinese Patent Application No. 201910330212.9, entitled "VIDEO RECOMMENDATION METHOD AND APPARATUS, COMPUTER DEVICE, AND STORAGE MEDIUM" filed with the China National Intellectual Property Administration on Apr. 23, 2019. The above applications are incorporated by reference in their entireties.

TECHNICAL FIELD

The present disclosure relates to the field of machine learning, and in particular, to a video recommendation method and apparatus, a computer device, and a storage medium.

BACKGROUND

With the development of network technologies, an increasing number of users can watch a video at any time by using a terminal, and a server may recommend to a user, from a mass video database, some videos in which the user may be interested, thereby better meeting a video watching requirement of the user.

In a recommendation process, the server may extract, based on an attentive collaborative filtering (ACF) model, a joint feature between any video and the user from the video library, repeatedly perform the foregoing step on each video in the video library, obtain a plurality of joint features corresponding to a plurality of videos, and further obtain a ranking order of all of the joint features according to a Euclidean distance between any two of the plurality of joint features, thereby recommending a video corresponding to a joint feature ranked on top to the user.

However, because user features are usually many in type and low in dimension, while video features are usually few in type and high in dimension, it can be seen that a property difference between the user features and the video features is huge. Moreover, in the foregoing ACF model, because of the property difference between the user features and the video features, it is easy to lose information in the user features and the video features, and it is further easy to cause gradient vanishing of the ACF model, affecting video recommendation accuracy.

SUMMARY

Embodiments of the present disclosure provide a video recommendation method, apparatus, computer device, and storage medium, and a recommended video presentation method, apparatus, electronic device, and storage medium.

For example, a video recommendation method is provided, performed by a computer device, the method including:
inputting a video to a first feature extraction network;
performing feature extraction on at least one consecutive video frame in the video by using the first feature extraction network to generate a video feature of the video;
inputting user data of a user to a second feature extraction network;
performing feature extraction on the discrete user data by using the second feature extraction network to generate a user feature of the user;
performing feature fusion based on the video feature and the user feature to obtain a recommendation probability of recommending the video to the user; and
determining, according to the recommendation probability, whether to recommend the video to the user.

A recommended video presentation method is provided, performed by an electronic device, the method including:
displaying a video presentation interface, the video presentation interface including at least one first recommended video;
transmitting, in response to that a click/tap operation on any first recommended video is detected, a watching record of the first recommended video to a server in response to the click/tap operation, the watching record being used for instructing the server to optimize and train a video recommendation model based on the watching record and return video information of at least one second recommended video in real time; and
presenting, in response to that the video information of at least one second recommended video is received, the at least one second recommended video in the video presentation interface based on the video information of the at least one second recommended video.

A video recommendation apparatus is provided, including:
a first output module, configured to input a video to a first feature extraction network, perform feature extraction on at least one consecutive video frame in the video by using the first feature extraction network, and output a video feature of the video;
a second output module, configured to input user data of a user to a second feature extraction network, perform feature extraction on the discrete user data by using the second feature extraction network, and output a user feature of the user;
a fusion and obtaining module, configured to perform feature fusion based on the video feature and the user feature, and obtain a recommendation probability of recommending the video to the user; and
a determining and recommendation module, configured to determine, according to the recommendation probability, whether to recommend the video to the user.

In an embodiment, the first output module includes:
a convolution and extraction unit, configured to separately input the at least one consecutive video frame in the video to a temporal convolutional network and a convolutional neural network in the first feature extraction network, perform convolution on the at least one consecutive video frame by using the temporal convolutional network and the convolutional neural network, and extract the video feature of the video.

In an embodiment, the convolution and extraction unit includes:
a causal convolution subunit, configured to input at least one image frame included in the at least one consecutive video frame in the video to the temporal convolutional network in the first feature extraction network, perform causal convolution on the at least one image frame by using the temporal convolutional network, and obtain an image feature of the video;

a convolution subunit, configured to input at least one audio frame included in the at least one consecutive video frame to the convolutional neural network in the first feature extraction network, perform convolution on the at least one audio frame by using the convolutional neural network, and obtain an audio feature of the video; and a fusion subunit, configured to perform feature fusion on the image feature of the video and the audio feature of the video, and obtain the video feature of the video.

In an embodiment, the fusion subunit is configured to:

perform bilinear pooling on the image feature of the video and the audio feature of the video, and obtain the video feature of the video.

In an embodiment, the second output module includes:

a first input unit, configured to input the user data of the user to the second feature extraction network;

a first linear combination unit, configured to perform general linear combination on the discrete user data by using a wide component in the second feature extraction network, and obtain a wide feature of the user;

a first embedding and convolution unit, configured to perform embedding and convolution on the discrete user data by using a deep component in the second feature extraction network, and obtain a deep feature of the user; and a first fusion unit, configured to perform feature fusion on the wide feature of the user and the deep feature of the user, and obtain the user feature of the user.

In an embodiment, the first fusion unit is configured to:

cascade the wide feature of the user and the deep feature of the user by using a fully-connected layer, and obtain the user feature of the user.

In an embodiment, the fusion and obtaining module is configured to:

perform dot multiplication on the video feature and the user feature, and obtain the recommendation probability of recommending the video to the user.

In an embodiment, the apparatus further includes:

a third input module, configured to input a text corresponding to the video to a third feature extraction network, perform feature extraction on the discrete text by using the third feature extraction network, and output a text feature corresponding to the video.

In an embodiment, the third input module includes:

a second input unit, configured to input the text to the third feature extraction network;

a second linear combination unit, configured to perform general linear combination on the discrete text by using a wide component in the third feature extraction network, and obtain a wide feature of the text;

a second embedding and convolution unit, configured to perform embedding and convolution on the discrete text by using a deep component in the third feature extraction network, and obtain a deep feature of the text; and a second fusion unit, configured to perform feature fusion on the wide feature of the text and the deep feature of the text, and obtain the text feature corresponding to the video.

In an embodiment, the second fusion unit is configured to:

cascade the wide feature of the text and the deep feature of the text by using a fully-connected layer, and obtain the text feature corresponding to the video.

In an embodiment, the second fusion unit is further configured to cascade the wide feature of the text and the deep feature of the text by using a fully-connected layer, and obtain the text feature corresponding to the video.

In an embodiment, the fusion and obtaining module includes:

a third fusion unit, configured to perform feature fusion on the video feature and the user feature, and obtain a first associated feature between the video and the user;

the third fusion unit being further configured to perform feature fusion on the text feature and the user feature, and obtain a second associated feature between the text and the user; and a dot multiplication unit, configured to perform dot multiplication on the first associated feature and the second associated feature, and obtain the recommendation probability of recommending the video to the user.

In an embodiment, the third fusion unit is configured to:

perform bilinear pooling on the video feature and the user feature, and obtain the first associated feature between the video and the user; and the third fusion unit is further configured to:

perform bilinear pooling on the text feature and the user feature, and obtain the second associated feature between the text and the user.

In an embodiment, the determining and recommendation module is configured to:

determine, when the recommendation probability is greater than a probability threshold, to recommend the video to the user; and determine, when the recommendation probability is less than or equal to the probability threshold, not to recommend the video to the user.

In an embodiment, the determining and recommendation module is configured to:

repeatedly perform an operation of generating a recommendation probability on each of two or more videos, and obtain two or more recommendation probabilities;

obtain probability ranks of all of the two or more recommendation probabilities in descending order, and determine, when a probability rank is less than or equal to a target threshold, to recommend a video corresponding to the corresponding probability rank to the user; and determine, when a probability rank is greater than the target threshold, not to recommend a video corresponding to the corresponding probability rank to the user.

A recommended video presentation apparatus is provided, including:

a display module, configured to display a video presentation interface, the video presentation interface including at least one first recommended video;

a transmission module, configured to transmit, in response to that a click/tap operation on any first recommended video is detected, a watching record of the first recommended video to a server, the watching record being used for instructing the server to optimize and train a video recommendation model based on the watching record and return video information of at least one second recommended video in real time; and a presentation module, configured to present, after that the video information of at least one second recommended video is received, the at least one second recommended video in the video presentation interface based on the video information of the at least one second recommended video.

A recommended video presentation apparatus, comprising:

a display, configured to display at least one first recommended video; and a transmitter, configured to transmit, in response to that a click/tap operation on any first recommended video is detected, a watching record of the first recommended video to a server to train a video recommendation model of the server based on the watching record for providing video information of at least one second recommended video in real time based on the video recommendation model trained with the watching record, wherein the display is further configured to present the at least one second recommended video.

A video recommendation method, comprising:

providing at least one first recommended video to a client terminal;

receiving a watching record of the first recommended video transmitted to a server by the client terminal in response to a click/tap operation on any one of the at least one first recommended video;

training a video recommendation model based on the watching record; and transmitting at least one second recommended video derived from the video recommendation model in real time to the client terminal.

A computer device is provided, including a processor and a memory, the memory storing computer-readable instructions, the computer-readable instructions, when executed by the processor, causing the processor to perform operations in the video recommendation method described above.

A server system, comprising at least one processor and memory, the at least one memory storing computer-readable instructions, the at least one processor is configured to execute the computer-readable instructions to perform operations in the video recommendation method described above.

An electronic device is provided, including a processor and a memory, the memory storing computer-readable instructions, the computer-readable instructions, when executed by the processor, causing the processor to perform operations of the recommended video presentation method described above.

A non-transitory computer-readable storage medium is provided, storing computer-readable instructions, the computer-readable instructions, when executed by one or more processors, causing the one or more processors to perform operations of the video recommendation method described above, or operations of the recommended video presentation method described above.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer, the following further describes implementations of the present disclosure in detail with reference to the accompanying drawings.

Figure 1:
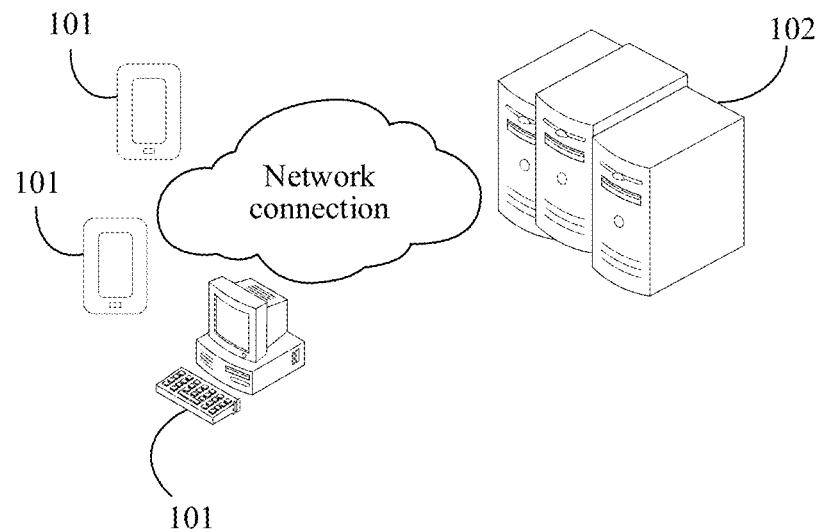
FIG. 1 is a schematic diagram of an implementation environment of a video recommendation method according to an embodiment of the present disclosure.

FIG. 1 is a schematic diagram of an implementation environment of a video recommendation method according to an embodiment of the present disclosure. Referring to FIG. 1, the implementation environment may include at least one terminal 101 and a server 102, and each terminal 101 communicates with the server 102 through a network connection.

The at least one terminal 101 is used for browsing a video, and the server 102 is used for recommending a video to at least one user corresponding to the at least one terminal 101.

In some embodiments, an client application terminal may be installed on each of the at least one terminal 101, and the client application terminal may be any client that can provide a video browsing service. The server 102 may collect sample user data and a sample video based on a behavior log of a user on the client application terminal, thereby performing training according to the sample user data and the sample video, to obtain a first feature extraction network, a second feature extraction network, and a third feature extraction network.

Based on the above description, the server 102 can determine, based on the first feature extraction network, the second feature extraction network, and the third feature extraction network, whether to recommend any video to any user. Therefore, in some embodiments, the server 102 can sift out at least one video from a plurality of videos for each user, thereby performing video recommendation for the user. After the server 102 determines to transmit the at least one recommended video to the at least one terminal 101, the at least one terminal 101 may present the at least one recommended video based on a video presentation interface, where the at least one recommended video is the at least one video recommended by the server to the user corresponding to the terminal.

Figure 2:
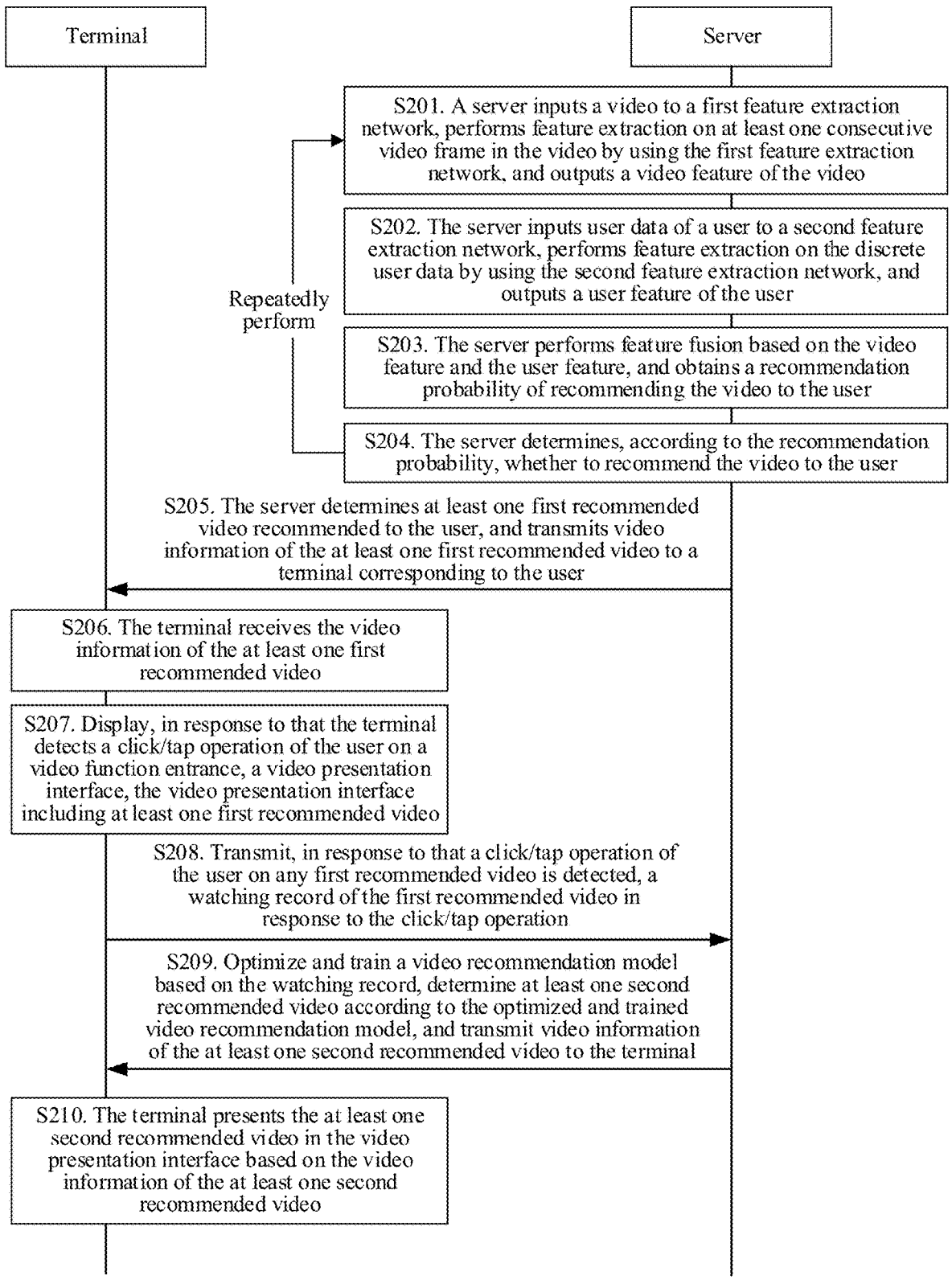
FIG. 2 is an interaction flowchart of a video recommendation method according to an embodiment of the present disclosure.

FIG. 2 is an interaction flowchart of a video recommendation method according to an embodiment of the present disclosure. Referring to FIG. 2, this embodiment is applicable to an interaction process between a computer device and an electronic device. The present disclosure is described by using only an example in which the computer device is a server and the electronic device is a terminal, and this embodiment includes:

S201. A server inputs a video to a first feature extraction network, performs feature extraction on at least one consecutive video frame in the video by using the first feature extraction network, and outputs a video feature of the video.

The video may be any video in a local video library, the video may alternatively be any video downloaded from a cloud, and the video may include at least one consecutive video frame.

S202. The server inputs user data of a user to a second feature extraction network, performs feature extraction on the discrete user data by using the second feature extraction network, and outputs a user feature of the user.

The user may be a user corresponding to any terminal, the user data may include personal information and video preference of the user, the personal information may include at least one of the user gender, the user age, the region in which the user is located, or the user occupation, and the personal information may be information authorized by the user to the server. The video preference may be obtained by the server by performing data analysis on a video watching behavior log of the user.

In some embodiments, because personal information, video preference, and the like in user data are usually one or more isolated word vectors, the user data is discrete. In this case, after the discrete user data is inputted to the second feature extraction network, the discrete user data can be converted into a consecutive feature vector through the function of the second feature extraction network, and the feature vector can embody a joint feature of the discrete user data.

S203. The server performs feature fusion based on the video feature and the user feature, and obtains a recommendation probability of recommending the video to the user.

In some embodiments, the server may calculate the dot product of the video feature and the user feature, that is, calculate an inner product of the video feature and the user feature, which is sum of products of values in corresponding locations in the video feature and the user feature. The sum of the products (the inner product) can be used as recommendation probability.

S204. The server determines, according to the recommendation probability, whether to recommend the video to the user.

In step S204, the server determines, according to the recommendation probability, whether to recommend the video to the user, and for each of different users and each of different videos, the server may perform the foregoing video recommendation process in steps S201 to S204, thereby determining whether to recommend any video to any user. In this embodiment of the present disclosure, performing step S205 is described by using an example of determining at least one first recommended video for the same user; for different users, a similar process is performed, and details are not described herein again.

S205. The server repeatedly performs steps S201 to S204, determines at least one first recommended video recommended to the user, and transmits video information of the at least one first recommended video to a terminal corresponding to the user.

In step S205, the server may set a recommendation quantity threshold for the first recommended video, the recommendation quantity threshold may be any value greater than or equal to 1, and for different users, recommendation quantity thresholds may be the same or different.

In some embodiments, the server may analyze a video watching behavior log of a user, so that a recommendation quantity threshold corresponding to the user is positively correlated to an average daily video watching duration of the user, that is, when an average daily video watching duration of a user is longer, a quantity of first recommended videos corresponding to the user is larger. For example, if an average daily video watching duration of a user is 1 hour, 2 first recommended videos may be transmitted to a terminal of the user, while if an average daily video watching duration of a user is 3 hours, 6 first recommended videos may be transmitted to a terminal of the user.

S206. The terminal receives the video information of the at least one first recommended video.

The video information may be at least one of a thumbnail, a web page link or a text of the at least one first recommended video. For example, for a first recommended video, the video information may include a thumbnail, a web page link, a title, author information, and a digest of the first recommended video, and content of the video information is not specifically limited in the embodiments of the present disclosure. Certainly, the video information may alternatively be the at least one first recommended video itself, thereby preventing the terminal from frequently transmitting an access request to the server in a subsequent interaction process.

S207. Display, in response to that the terminal detects a click/tap operation of the user on a video function entrance, a video presentation interface, the video presentation interface including at least one first recommended video.

The video function entrance may be provided by any client application terminal supporting video presentation on the terminal, the video presentation interface may include at least one user interface (UI) card, and each user interface card is used for presenting one first recommended video. Certainly, the video presentation interface may alternatively include at least one window, each window is used for presenting one first recommended video, and the form of presenting the first recommended video in the video presentation interface is not specifically limited in the embodiments of the present disclosure.

Figure 3:
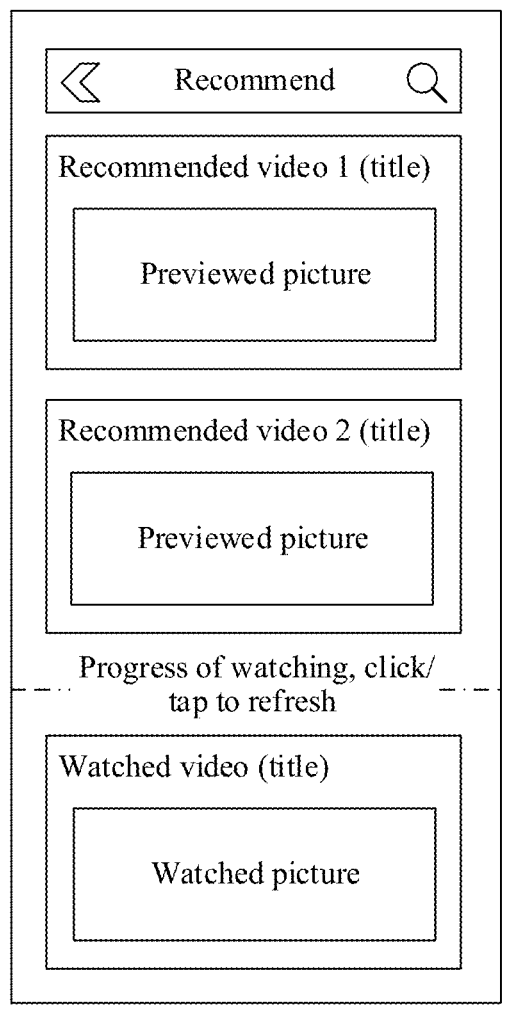
FIG. 3 is a schematic diagram of a video presentation interface according to an embodiment of the present disclosure.

In some embodiments, the video function entrance may be a function option on a main interface of the client application terminal, so that when the terminal detects a click/tap operation of the user on the function option, display is switched from the main interface of the client application terminal to the video presentation interface. FIG. 3 is a schematic diagram of a video presentation interface according to an embodiment of the present disclosure. Referring to FIG. 3, a terminal may present a plurality of first recommended videos on the video presentation interface.

Certainly, in some embodiments, the video function entrance may alternatively be an icon of the client application terminal, so that when the terminal detects a click/tap operation on the icon of the client application terminal, the terminal directly starts the client application terminal to display the video presentation interface. In this case, the main interface of the client application terminal is the video presentation interface.

The at least one first recommended video is determined based on a plurality of recommendation probabilities, and one recommendation probability may be a probability obtained by performing fusion based on at least one of a user feature of a current user outputted by the first feature extraction network, a video feature of a to-be-recommended video outputted by the second feature extraction network, or a text feature outputted by the third feature extraction network.

In step S207, the terminal may present the video information of the at least one first recommended video only in the video presentation interface, transmit, in response to that a click/tap operation of the user on any first recommended video is detected, an access request to a web page link corresponding to the first recommended video, thereby locally buffering the first recommended video and playing the first recommended video based on a video presentation control, which implementation saves storage space of the terminal and improves processing efficiency of the terminal.

In some embodiments, alternatively, while displaying the video presentation interface, the terminal may transmit an access request to a web page link corresponding to each of the at least one first recommended video to locally buffer the at least one first recommended video and directly play, in response to that a click/tap operation of the user on any first recommended video is detected, the first recommended video based on a video presentation control, thereby completing a process of loading each first recommended video on the interface when displaying the video presentation interface. When the user performs click/tap, the first recommended video can be played in time, thereby shortening a duration for which the user waits for video loading and optimizing a video recommendation effect.

Certainly, if the server directly transmits the at least one first recommended video to the terminal, the terminal may further directly automatically play a video with a highest recommendation probability after the video presentation interface is displayed, thereby simplifying a video playing process.

S208. Transmit, in response to that the terminal detects a click/tap operation on any first recommended video, a watching record of the first recommended video to a server in response to the click/tap operation, the watching record being used for instructing the server to optimize and train a video recommendation model based on the watching record and to return video information of at least one second recommended video in real time.

In the foregoing process, in response to a click/tap operation of the user on any first recommended video, the terminal transmits a watching record of the first recommended video to the server, and the watching record may include an exposure duration, an accumulated quantity of watching times, and the like of the first recommended video.

S209. Optimize and train, after the server receives the watching record, a video recommendation model based on the watching record and determine at least one second recommended video according to the optimized and trained video recommendation model, and transmit video information of the at least one second recommended video to the terminal.

The video recommendation model includes at least one of the first feature extraction network, the second feature extraction network, or the third feature extraction network.

In the foregoing training process, the server can collect watching records of users for first recommended videos. Based on the watching records, the server can label a first recommended video whose exposure duration is greater than a preset duration as a positive example in the optimization and training process (that is, labeled as true) and label a first recommended video whose exposure duration is less than or equal to the preset duration as a negative example in the optimization and training process in (that is, labeled as false). The specific training process is similar to that of a video recommendation method in the following embodiments, but the video needs to be replaced with a labeled first recommended video. Details are not described herein, and the video recommendation model can be dynamically optimized and trained through step S209.

The foregoing process of determining the second recommended video and transmitting the video information of the second recommended video is similar to that in steps S201 to S205, and details are not described herein.

S210. Present, after the terminal receives the video information of at least one second recommended video, the at least one second recommended video in the video presentation interface based on the video information of the at least one second recommended video.

Step S210 is similar to steps S206 and S207, and details are not described herein.

In the foregoing process, in response to that the terminal detects a click/tap operation of the user on any first recommended video, the terminal transmits a watching record to the server in response to the click/tap operation, and the server dynamically optimizes and trains feature extraction networks in the video recommendation model and then determines at least one second recommended video. Then the terminal presents each second recommended video, so that before the user clicks/taps a first recommended video and after the user clicks/taps the first recommended video, different recommending results are displayed in the video presentation interface.

For example, the server originally predicts that a probability that a user likes cat videos is the same as a probability that the user likes dog videos, and therefore ten determined first recommended videos include five cat videos and five dog videos. After the user clicks/taps a cat video pushed on the terminal, in which an exposure time of the video is greater than a preset duration, the terminal transmits a watching record to the server. After labeling the cat video as a positive example, the server optimizes and trains feature extraction networks in the video recommendation model. Because a quantity of positive examples of cat videos is increased by one, the server may predict that a probability that the user likes cat videos is greater than a probability that the user likes dog videos. Therefore, during a new round of prediction, ten determined second recommended videos include seven cat videos and three dog videos.

In some embodiments, alternatively, after receiving a watching record, the server may not immediately perform an optimization and training process, but optimize and train feature extraction networks in the video recommendation model regularly. For example, the server performs optimization and training according to one or more watching records in a previous day at zero o'clock everyday and transmits a second recommended video to the terminal, so that the terminal updates a recommended video presented in the video presentation interface, thereby avoiding training feature extraction networks in the video recommendation model once each time one watching record is added, alleviating a performance fluctuation problem of the feature extraction networks and improving stability of the feature extraction networks.

In the method provided in this embodiment of the present disclosure, a video is inputted to a first feature extraction network, feature extraction is performed on at least one consecutive video frame in the video by using the first feature extraction network, and a video feature of the video is outputted; because video features are few in type and high in dimension, a high-dimensional video feature is targeted and extracted without adding an excessively large calculation pressure. User data of a user is inputted to a second feature extraction network, and feature extraction is performed on the discrete user data by using the second feature extraction network. Then, a user feature of the user is outputted. Because user features are many in type and low in dimension, a low-dimensional user feature may be targeted and extracted based on the second feature extraction network, thereby reducing a calculation pressure of extracting the user feature. Feature fusion is performed based on the video feature and the user feature, and a recommendation probability of recommending the video to the user is obtained. Whether to recommend the video to the user is determined according to the recommendation probability. The above implementation performs feature extraction on the user feature and the video feature, between which a characteristic difference is relatively large, by using different networks respectively, avoiding loss of information in the user feature and the video feature and alleviating the gradient vanishing problem, and improving video recommendation accuracy.

In another aspect, a video presentation interface is displayed on the terminal, at least one first recommended video is presented on the video presentation interface, and in response to that a click/tap operation of a user on any first recommended video is detected, a watching record of the recommended video is transmitted to a server in response to the click/tap operation, thereby feeding back quality of the current first recommended video to the user in time, so that the server can differentiate and label true and false samples of the first recommended video based on the watching record and take the first recommended video as a sample video in a new round of optimization and training to dynamically optimize and train the video recommendation model. The server may further return video information of at least one second recommended video to the terminal according to the optimized and trained video recommendation model, and after the terminal receives the video information of the at least one second recommended video, the at least one second recommended video is presented in the video presentation interface based on the video information of the at least one second recommended video. Therefore, with the click/tap operation of the user, a recommended video with higher recommendation accuracy can be updated and presented in real time on the video presentation interface.

The foregoing embodiments provide a video recommendation process in which the terminal and the server interact. After determining any recommended video, the server pushes the recommended video to the terminal, so that the terminal presents the recommended video based on the video presentation interface. The server can further update the recommended video in the video presentation interface after the user clicks/taps the recommended video. How to determine a recommended video on the server is described in detail in embodiments of the present disclosure. After a recommended video is determined, a terminal-side display process similar to that in steps S206 to S210 in the foregoing embodiment may still be performed, and details are not described in this embodiment of the present disclosure.

Figure 4:
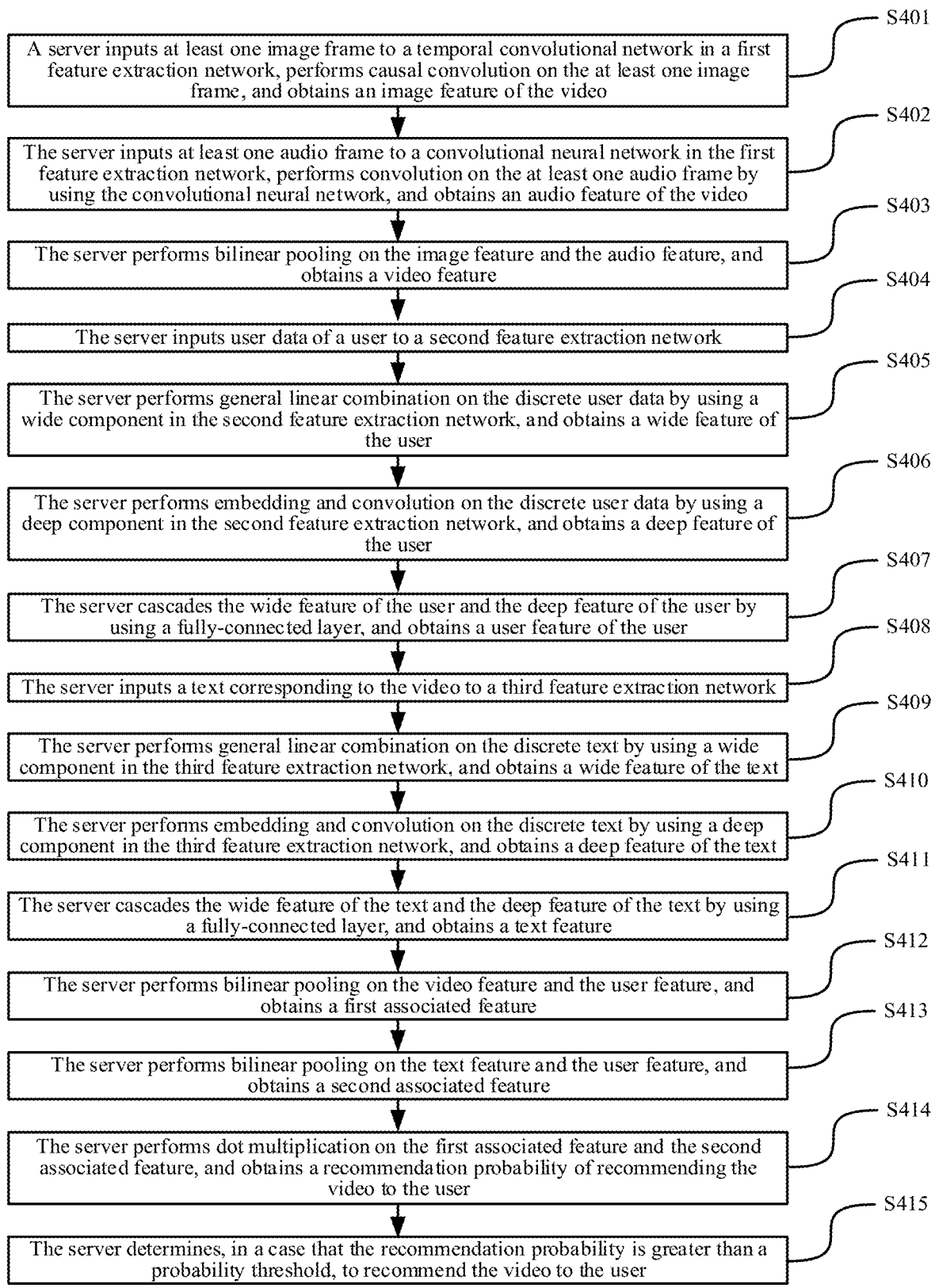
FIG. 4 is a flowchart of a video recommendation method according to an embodiment of the present disclosure.

FIG. 4 is a flowchart of a video recommendation method according to an embodiment of the present disclosure. Referring to FIG. 4, this embodiment is applicable to a computer device. The computer device being a server is only used as an example for description in this embodiment of the present disclosure. The method includes the following steps:

S401. A server inputs at least one image frame included in at least one consecutive video frame in a video to a temporal convolutional network in a first feature extraction network, performs causal convolution on the at least one image frame by using the temporal convolutional network, and obtains an image feature of the video.

The video may be any video in a local video library, the video may alternatively be any video downloaded from a cloud storage, and the video may include at least one consecutive video frame. The at least one consecutive video frame may include at least one image frame and at least one audio frame. Usually, each consecutive video frame includes one image frame and one audio frame. It may be understood that the at least one image frame may be represented in the form of a sequence, an array, a linked list, or the like, and the representation form of an image frame is not specifically limited in the embodiments of the present disclosure.

The image feature of the video may include at least one image frame feature corresponding to the at least one image frame. An image frame feature is used for representing an image feature of an image frame and an association between the image frame and another image frame before the image frame.

In some embodiments, the first feature extraction network may include a temporal convolutional network (TCN) and a convolutional neural network (CNN), where the TCN may be used for extracting an image feature, and the CNN may be used for extracting an audio feature. The CNN is described in detail in step 402, and details are not described herein again.

Based on the foregoing situation, after the server inputs at least one consecutive video frame of a video to the first feature extraction network, at least one image frame and at least one audio frame of the at least one consecutive video frame are separated. The at least one image frame is inputted to the TCN separately, and the TCN independently extracts an image feature of the video. The at least one audio frame is inputted to the CNN, and the CNN independently extracts an audio feature of the video. Feature fusion is further performed on the image feature outputted by the TCN and the audio feature outputted by the CNN, thereby obtaining a video feature of the video.

Exemplarily, the TCN may include an input layer, at least one hidden layer, and an output layer. The input layer is used for decoding an inputted image frame. The at least one hidden layer is used for performing causal convolutions on a decoded image frame, and the output layer is used for performing nonlinear processing and normalization on an image frame obtained through causal convolution.

In the foregoing TCN, the input layer, the at least one hidden layer, and the output layer are connected in series. The foregoing serial connection in a feature extraction process is described below: The server inputs at least one image frame of the video to the input layer, inputs at least one image frame decoded by the input layer to a first hidden layer, and inputs at least one feature map outputted by the first hidden layer to a second hidden layer. The rest can be deduced by analogy, until at least one feature map outputted by a last hidden layer is inputted to the output layer. At least one image frame feature outputted by the output layer is an image feature of the video extracted by the TCN.

In the foregoing architecture, each hidden layer may include at least one convolution kernel (filter). For any hidden layer, when causal convolution is performed on at least one feature map outputted by a previous hidden layer in a conventional CNN framework, one convolution kernel is used for performing convolution on one feature map. In the TCN provided in this embodiment of the present disclosure, one convolution kernel is used for performing convolution on a plurality of feature maps. Such convolution is referred to as "causal convolution", where the foregoing plurality of feature maps may include a feature map at a current moment and at least one feature map corresponding to at least one moment before the current moment.

Based on the foregoing architecture, in step S401, the server inputs the at least one image frame to the TCN, causal convolution is performed on the at least one image frame by using at least one hidden layer of the TCN, and at least one image frame feature corresponding to the at least one image frame is outputted, thereby determining the at least one image frame feature as an image feature of the video.

In some embodiments, when causal convolution is performed in any hidden layer on a feature map at any moment of at least one feature map outputted by a previous hidden layer, convolution is separately performed on the feature map of the moment and at least one feature map corresponding to at least one preceding moment according to a convolution kernel corresponding to the moment in the hidden layer. After a plurality of obtained feature maps are superimposed, a feature map at the moment outputted by the current hidden layer is obtained. The "superimposing" mentioned herein refers to directly adding values in corresponding locations in the plurality of feature maps.

Figure 5:
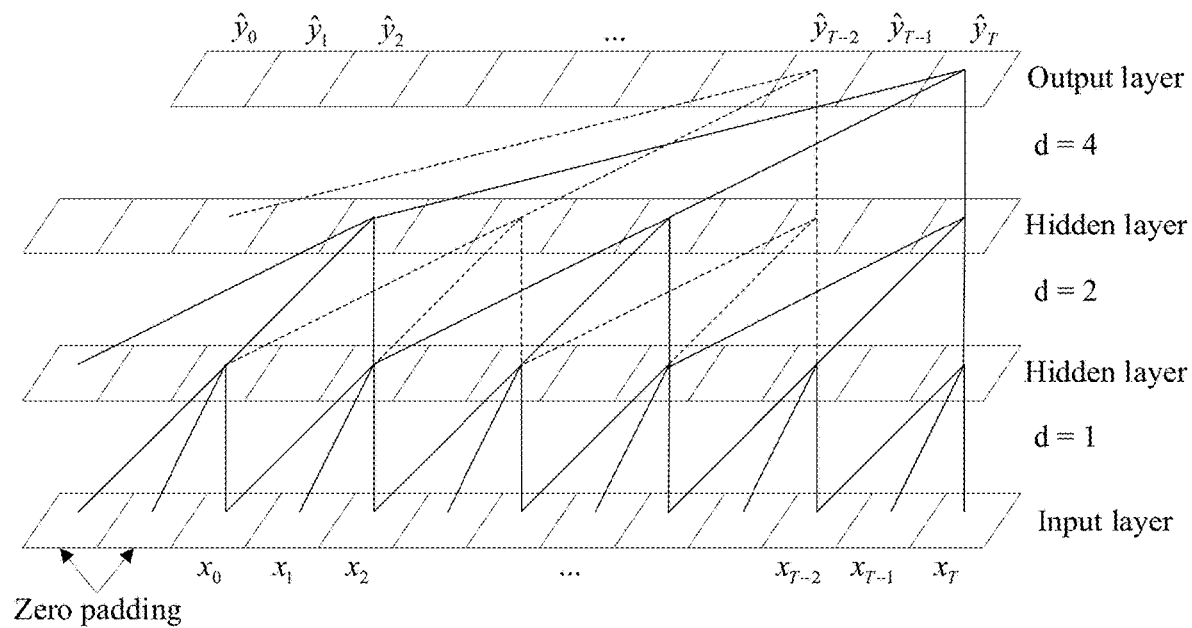
FIG. 5 is a schematic diagram of a temporal convolutional network according to an embodiment of the present disclosure.

For example, FIG. 5 is a schematic diagram of a temporal convolutional network according to an embodiment of the present disclosure. Referring to FIG. 5, in the first hidden layer, when causal convolution is performed on an image frame at a moment T in the input layer, convolution is performed on three image frames of such three moments as the moment T, a moment T−1, and a moment T−2 in the input layer according to a $T^{th}$ convolution kernel in the first hidden layer. Then, feature map at the moment T in the first hidden layer is obtained, where T is any value greater than or equal to 0. In the TCN framework shown in FIG. 5, one convolution kernel is used for performing convolution on three feature maps. However, in some embodiments, one convolution kernel in the TCN may perform convolution on feature map in any quantity greater than or equal to 2, and FIG. 5 is not to constitute any specific limitation on the quantity of feature maps included in each time of causal convolution in the TCN.

By introducing the causal convolution operation, compared with the related CNN framework, there is a causal relationship between layers of the TCN, and in a current layer, information about a correlation between image frames in a previous layer that have a time sequence association may be considered. Thus, each image frame feature in the output layer may represent both an image feature of an image frame and an association between the image frame and a preceding image frame. Further, compared with a long short-term memory (LSTM) network framework that usually has a relatively good memory capability, because the LSTM includes a forget gate, it is unavoidable to miss some historical information during processing. However, because no forget gate needs to be set in the TCN, missing of historical information can be avoided. Moreover, as the TCN goes deeper, a feature map obtained after causal convolution may include information about each image frame of image data in the input layer.

In some embodiments, when causal convolution is performed, zero padding may be performed on at least one feature map outputted by a previous hidden layer. At least one zero padding layer is added to the periphery of each feature map, and the quantity of zero padding layers may be determined according to the size of the convolution kernel and the stride of causal convolution, thereby ensuring that the size of a feature map outputted by each hidden layer and that of an inputted feature map are consistent.

In some embodiments, any convolution kernel in the foregoing each hidden layer may alternatively be a hole convolution (also referred to as dilated convolution) kernel. The hole convolution kernel refers to a new convolution kernel formed by inserting at least one zero element between neighboring elements in an original convolution kernel. Because holes are uniformly padded with 0 in the hole convolution kernel, no new convolution kernel parameter is obtained. Therefore, the size of the convolution kernel can be effectively enlarged without additionally adding any convolution kernel parameter, thereby increasing the size of the receptive field. A better fitting effect can be achieved, and the layer quantity of hidden layers in the TCN can be further reduced, thereby reducing the calculation amount of the TCN training process, and shortening the training duration of the TCN.

In the foregoing situation, if the convolution kernel is a hole convolution kernel, a causal convolution operation is also likewise performed, that is, one hole convolution kernel is also used for performing convolution on a plurality of feature maps. Exemplarily, the plurality of feature maps may be feature maps neighboring in time sequence, or may be feature maps not neighboring in time sequence. If the plurality of feature maps are not neighboring in time sequence, time sequence intervals between neighboring feature maps of the plurality of feature maps may be the same or different, and whether time sequence intervals between neighboring feature maps are the same is not specifically limited in the embodiments of the present disclosure.

In some embodiments, if the plurality of feature maps are not neighboring in time sequence and have the same time sequence interval, a dilation factor d greater than or equal to 1 may be set for each hidden layer, and d is a positive integer. The time sequence interval is determined as d−1, so that the time sequence interval is a positive integer greater than or equal to 0, and therefore a case of being neighboring in time sequence (that is, time sequence interval d−1=0) can be considered as a special case of dilation factor d=1. Dilation factors in different hidden layers may be the same or different, and the value of the dilation factor is not specifically limited in the embodiments of the present disclosure. Certainly, the server may alternatively directly set the time sequence interval as a hyper-parameter, and whether to set the dilation factor is not specifically limited either in the embodiments of the present disclosure.

Based on the foregoing example, referring to FIG. 5, when causal convolution is performed in the first hidden layer, a hole convolution kernel whose dilation factor d=1 is used. Causal convolution is performed on image frames at a moment T, a moment T−1, and a moment T−2, and features of image frames in the input layer and an association between the image frames can be completely extracted. When causal convolution is performed in the second hidden layer, a hole convolution kernel whose dilation factor d=2 is used. Neighboring feature maps selected during each time of causal convolution are spaced apart by 1 feature map, and causal convolution is performed on feature maps corresponding to image frames at the moment T, the moment T−2, and a T−4 moment. In the third hidden layer, a hole convolution kernel whose dilation factor d=4 is used, neighboring feature maps selected during each time of causal convolution are spaced apart by 3 feature map. Causal convolution is performed on feature maps corresponding to image frames at the moment T, the moment T−4, and a T−8 moment, thereby reducing the layer quantity of hidden layers in the TCN, reducing the calculation amount of the TCN training process, and shortening the training duration of the TCN. In another aspect, using the hole convolution kernel each time causal convolution is performed effectively enlarges the size of the convolution kernel and increases the size of the receptive field, thereby achieving a better fitting effect.

In some embodiments, a residual connection may be used between the at least one hidden layer. The residual connection is described below: For each hidden layer, any feature map outputted by a previous hidden layer and a corresponding feature map outputted by the current hidden layer may be superimposed to obtain a residual block, and the residual block is used as a feature map to be inputted to a next hidden layer, thereby resolving a degradation problem of the TCN. Therefore, as the TCN goes deeper, accuracy of extracting an image feature is better.

In some embodiments, when using the residual connection, before feature maps are superimposed, if the dimension of a feature map outputted by a preceding hidden layer and the dimension of a feature map outputted by a current hidden layer are different, a convolutional operation may be performed, by using a convolution kernel whose size is 1×1, on the feature map outputted by the previous hidden layer, thereby performing dimension expansion or dimension reduction on the feature map outputted by the previous hidden layer and further ensuring that dimensions of two feature maps involved in the superimposition process are the same.

Figure 6:
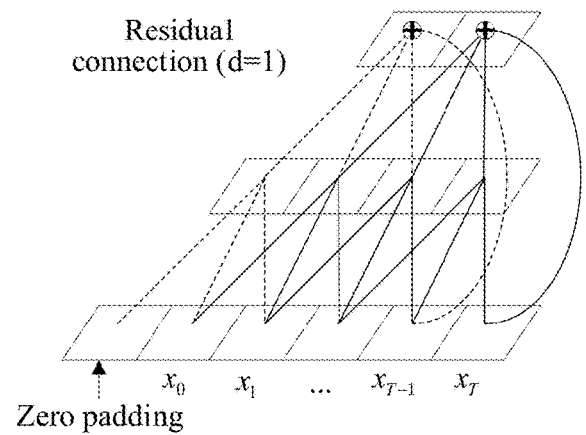
FIG. 6 is a schematic diagram of a temporal convolutional network according to an embodiment of the present disclosure.

For example, FIG. 6 is a schematic diagram of a temporal convolutional network according to an embodiment of the present disclosure. Referring to FIG. 6, description is made by using an example in which each hidden layer has a dilation factor d=1. In a first hidden layer, causal convolution is performed on image frames at a moment T, a moment T−1, and a moment T−2 in an input layer; and before causal convolution is performed on feature maps at the moment T, the moment T−1, and the moment T−2 in a second hidden layer, the image frame at the moment T and the feature map at the moment T are superimposed, the image frame at the moment T−1 and the feature map at the moment T−1 are superimposed, and the image frame at the moment T−2 and the feature map at the moment T−2 are superimposed. The "superimposing" mentioned herein refers to directly adding values in corresponding locations in any two feature maps. Exemplarily, if any image frame and a corresponding feature map are different in dimension, a convolutional operation may be performed on the image frame by using a convolution kernel whose size is 1×1, to cause the image frame and the feature map to be the same in dimension.

In some embodiments, at least one nonlinear layer may be further introduced between hidden layers, the nonlinear layer is used for performing nonlinear processing on feature maps outputted by the hidden layers, and any activation function that can add a nonlinear factor may be used as the nonlinear layer. For example, the activation function may be a sigmoid function, a tanh function, or a ReLU function.

In some embodiments, at least one weight normalization layer may be further introduced between hidden layers, thereby normalizing weights of convolution kernels, so that feature maps outputted by all of the hidden layers have similar distribution, thereby increasing the training speed of the TCN, and alleviating the gradient vanishing problem of the TCN. If the TCN has both a nonlinear layer and a weight normalization layer, a weight normalization layer is first cascaded after any hidden layer, and a nonlinear layer is then cascaded after the weight normalization layer.

In some embodiments, the output layer may be an exponential normalization (softmax) layer, and exponential normalization is performed, based on a softmax function in the output layer, on feature maps outputted by the last hidden layer, to obtain an image feature of the video.

S402. The server inputs at least one audio frame included in the at least one consecutive video frame to a convolutional neural network in the first feature extraction network, performs convolution on the at least one audio frame by using the convolutional neural network, and obtains an audio feature of the video.

The at least one audio frame may be represented in the form of a sequence, an array, a linked list, or the like, and the representation form of an audio frame is not specifically limited in the embodiments of the present disclosure. The audio feature of the video may include an audio feature of each of the at least one audio frame.

In some embodiments, the CNN in the first feature extraction network is used for extracting an audio feature, the CNN may include an input layer, at least one hidden layer, and an output layer, the input layer is used for decoding an inputted audio frame, the at least one hidden layer is used for performing convolution on a decoded audio frame, and the output layer is used for performing nonlinear processing and normalization on an audio frame obtained through convolution. Exemplarily, the input layer, the at least one hidden layer, and the output layer are connected in series, which is similar to the foregoing connection manner of the TCN in step S401, and details are not described herein again.

In some embodiments, at least one pooling layer may be further introduced between hidden layers, and the pooling layer is used for compressing a feature map outputted by a preceding hidden layer, thereby reducing the size of the feature map. In some embodiments, a residual connection may also be used in the CNN, and is similar to the foregoing residual connection of the TCN in step S401, and details are not described herein again.

In some embodiments, the CNN may be a visual geometry group (VGG) network. In the VGG network, each hidden layer uses a 3*3 small convolution kernel and a 2*2 maximum pooling kernel, and a residual connection is used between hidden layers. Therefore, as the VGG network goes deeper, the size of the image is halved and the depth is doubled after each time of pooling, thereby simplifying the structure of the CNN, helping to obtain a frequency spectrogram of at least one audio frame, and helping to extract a high-level audio feature. For example, the CNN may be VGG-16 or VGG-19, and the architecture level of the VGG network is not specifically limited in the embodiments of the present disclosure.

Based on the foregoing architecture, in step S402, the server may input the at least one audio frame of the video to the CNN, convolution is performed on the at least one audio frame by using at least one hidden layer of the CNN, and at least one audio frame feature corresponding to the at least one audio frame is outputted, thereby determining the at least one audio frame feature as an audio feature of the video. Exemplarily, in any hidden layer, for a feature map at any moment of at least one feature map outputted by a previous hidden layer, convolution is performed on the feature map at the moment according to a convolution kernel corresponding to the moment in the hidden layer.

S403. The server performs bilinear pooling on the image feature of the video and the audio feature of the video, and obtains a video feature of the video.

In the foregoing process, the server may perform multi-modal compact bilinear pooling (MCB) on the image feature and the audio feature, and the MCB is introduced below: The server obtains a tensor product (outer product) of the image feature and the audio feature, and performs polynomial expansion on the tensor product by using a quadratic term, to obtain the video feature. Certainly, the server may alternatively perform expansion on the tensor product through a method such as Taylor expansion or power series expansion to obtain the video feature. Exemplarily, the server may approximately represent the tensor product by using a projection vector between the image feature and the audio feature, thereby reducing the calculation amount in the bilinear pooling process and shortening the duration used in the video recommendation process.

In some embodiments, the server may alternatively perform multi-modal low-rank bilinear pooling (MLB) on the image feature and the audio feature, and the MLB is introduced below: The server obtains a projection matrix of the image feature, obtains a projection matrix of the audio feature, obtains a Hadamard product of the projection matrix of the image feature and the projection matrix of the audio feature, and determines the Hadamard product as the video feature, thereby alleviating the defect that the MCB is limited by performance of a graphics processing unit (GPU), lowering requirements on the GPU, and reducing costs of bilinear pooling.

In some embodiments, the server may alternatively perform multi-modal factorized bilinear pooling (MFB) on the image feature and the audio feature, and the MFB is introduced below: The server obtains a low-rank projection matrix of the image feature, obtains a low-rank projection matrix of the audio feature, obtains a pooled sum (sum pooling) of the low-rank projection matrix of the image feature and the low-rank projection matrix of the audio feature, and determines the pooled sum as the video feature, thereby alleviating the defect of the convergence speed in the MLB, reducing the duration of bilinear pooling, and improving the efficiency of bilinear pooling.

In steps S401 and S402, the server obtains the image feature of the video based on the TCN, and obtains the audio feature of the video based on the CNN. Therefore, in step S403, the server may perform feature fusion on the image feature of the video and the audio feature of the video, obtain the video feature of the video, and perform feature extraction on the image feature and the audio feature respectively by using different network structures. An association between image frames is considered when extracting the image feature, thereby improving the capability of expressing the image feature; a simplified network structure is used when extracting the audio feature, thereby helping extract a deeper-level audio feature. Then the two features are fused to obtain the video feature, thereby improving the accuracy of the video recommendation process. In another aspect, because the image feature and the audio feature are usually relatively large in dimension, full interaction between the image feature and the audio feature can be ensured through bilinear pooling on the basis of improving feature fusion efficiency. Dimension reduction can be further efficiently performed on a fused feature.

In some embodiments, the server may alternatively not perform bilinear pooling on the image feature and the audio feature, but the server may perform feature fusion in a manner such as obtaining a dot product, obtaining an average value, or cascading, thereby further shortening the duration of the feature fusion, and reducing the calculation amount of the feature fusion process.

In steps S401 to S403, the server separately inputs the at least one consecutive video frame in the video to a temporal convolutional network and a convolutional neural network in the first feature extraction network, performs convolution on the at least one consecutive video frame by using the temporal convolutional network and the convolutional neural network, and extracts the video feature of the video. The first feature extraction network includes the TCN and the CNN. In some embodiments, the server may directly input at least one image frame and at least one audio frame of the video to the same TCN or CNN, and output a video feature of the video. That is, the server extracts both the image feature and the audio feature by using the same TCN or CNN, and therefore does not need to perform feature fusion on the image feature and the audio feature, thereby completing extraction on the video feature based on only one convolutional neural network, reducing the calculation amount for obtaining the video, and increasing the speed of obtaining the video feature. Certainly, the server may alternatively extract only the image feature of the video, or extract only the audio feature of the video, and similarly does not need to perform feature fusion, thereby reducing the calculation amount for obtaining the video, and increasing the speed of obtaining the video feature.

S404. The server inputs user data of a user to a second feature extraction network.

The user may be a user corresponding to any terminal, the user data may include personal information and video preference of the user, the personal information may include at least one of the user gender, the user age, the region in which the user is located, or the user occupation, and the personal information may be information authorized by the user to the server. The video preference may be obtained by the server by performing data analysis on a video watching behavior log of the user. In this disclosure, any one of pieces of personal information and video preferences in user data is referred to as one piece of user component information below, and therefore the user data includes at least one piece of user component information.

In the foregoing process, because the pieces of user component information in the user data are usually one or more isolated word vectors, the user data is discrete. In this case, after the discrete user data is inputted to the second feature extraction network, the discrete user data can be converted into a consecutive feature vector through the function of the second feature extraction network. The feature vector can embody a joint feature of the pieces of discrete user component information.

In the foregoing process, the second feature extraction network may include a wide component and a deep component. For example, the second feature extraction network may be a wide and deep network (wide and deep models), where the wide component is used for performing general linear processing on the user data. For example, the wide component may be a general linear model, and is described in detail below in step S405. Moreover, the deep component is used for performing embedding and convolution on the user data. For example, the deep component may be a deep neural network (DNN), and is described in detail below in step S406.

S405. The server performs general linear combination on the discrete user data by using a wide component in the second feature extraction network, and obtains a wide feature of the user.

The wide component may be a general linear model.

Based on the foregoing situation, the server may perform one-hot encoding on at least one piece of user component information in the user data to obtain at least one original feature of the user data, and input the at least one original feature to the wide component in the second feature extraction network, thereby making it convenient to perform linear combination in the wide component, and increasing the speed of obtaining the wide feature of the user.

In some embodiments, the general linear model may include a first weight matrix and a bias term. Therefore, in the foregoing step S405, the server can weight the at least one original feature based on the first weight matrix, and add each weighted original feature and the bias term, to obtain the wide feature of the user, where a quantity of weight terms of the first weight matrix is greater than or equal to a quantity of original features.

In some embodiments, the general linear model may include a second weight matrix and a bias term. Therefore, the server may obtain at least one cross feature between any two of the at least one original feature, weight the at least one original feature and the at least one cross feature based on the second weight matrix, and add each weighted original feature, each weighted cross feature, and the bias term, to obtain the wide feature of the user.

A cross feature is used for representing a product of any original feature and another original feature, and a quantity of weight terms of the second weight matrix is greater than or equal to a value obtained by adding a quantity of original features and a quantity of cross features.

S406. The server performs embedding and convolution on the discrete user data by using a deep component in the second feature extraction network, and obtains a deep feature of the user.

The wide component may be a DNN.

In some embodiments, the DNN may include an input layer, an embedding layer, at least one hidden layer, and an output layer, which are connected in series, where the embedding layer is used for converting at least one piece of user component information in the user data into a form of an embedding vector.

In the foregoing step S406, at least one piece of user component information is inputted to the embedding layer, the at least one piece of user component information is embedded through the embedding layer, and relatively sparse (that is, discrete) user data can be mapped to a low-dimensional space, to obtain at least one embedding vector, where one embedding vector corresponds to one piece of user component information. Then, the at least one embedding vector is inputted to the at least one hidden layer, the at least one embedding vector is convoluted through the at least one hidden layer, and the deep feature of the user is outputted.

S407. The server cascades the wide feature of the user and the deep feature of the user by using a fully-connected layer, and obtains a user feature of the user.

In the foregoing process, the server may cascade the wide feature of the user and the deep feature of the user through a fully-connected (FC) layer. In the fully-connected layer, the outputted user feature is connected to each component in the wide feature of the user and the deep feature of the user.

In the foregoing step S407, the server performs feature fusion on the wide feature of the user and the deep feature of the user, and obtains the user feature of the user. In some embodiments, the server may alternatively not cascade the wide feature of the user and the deep feature of the user, but may perform feature fusion in a manner such as obtaining a dot product or obtaining an average value, thereby shortening the duration of the feature fusion, and reducing the calculation amount of the feature fusion process. Certainly, the server may alternatively perform feature fusion of the wide feature of the user and the deep feature of the user through bilinear pooling, thereby ensuring full interaction between features.

Figure 7:
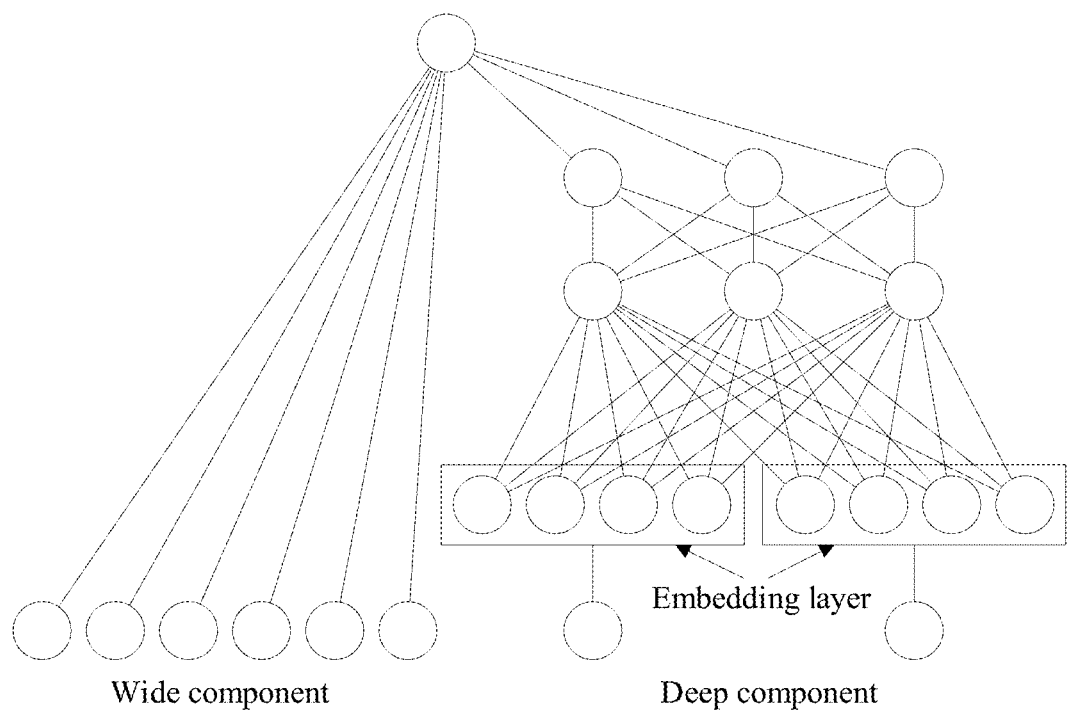
FIG. 7 is a schematic diagram of a second feature extraction network according to an embodiment of the present disclosure.

In the foregoing steps S404 to S407, the server inputs user data of a user to a second feature extraction network, performs feature extraction on the discrete user data by using the second feature extraction network, and outputs a user feature of the user, thereby not only considering the memory capability of the second feature extraction network by using the wide component, but also considering the generalization capability of the second feature extraction network by using the deep component, so that the second feature extraction network can more accurately express the user feature of the user. FIG. 7 is a schematic diagram of a second feature extraction network according to an embodiment of the present disclosure. Referring to FIG. 7, a left part is a wide component, a right part is a deep component, and details are not described herein again.

S408. The server inputs a text corresponding to the video to a third feature extraction network.

The text may be text type metadata of the video. For example, the text may be at least one of a title of the video, a label of the video, a comment of the video, an author of the video, or a digest of the video. The third feature extraction network and the network in the foregoing step S404 are similar in architecture, but parameters of the networks may be the same or different.

In the foregoing process, because information such as the text type metadata, the title of the video, the label of the video, the comment of the video, the author of the video, or the digest of the video is usually one or more isolated word vectors, the text is discrete. In this case, after the discrete text is inputted to the third feature extraction network, the discrete text can be converted into a consecutive feature vector through the function of the third feature extraction network, and the feature vector can embody a joint feature of the discrete text.

The foregoing step S408 and the foregoing step S404 are similar, and details are not described herein again.

S409. The server performs general linear combination on the discrete text by using a wide component in the third feature extraction network, and obtains a wide feature of the text.

The foregoing step S409 and the foregoing step S405 are similar, and details are not described herein again.

S410. The server performs embedding and convolution on the discrete text by using a deep component in the third feature extraction network, and obtains a deep feature of the text.

The foregoing step S410 and the foregoing step S406 are similar, and details are not described herein again.

S411. The server cascades the wide feature of the text and the deep feature of the text by using a fully-connected layer, and obtains a text feature corresponding to the video.

The foregoing step S411 and the foregoing step S407 are similar, and details are not described herein again.

In the foregoing step S411, the server performs feature fusion on the wide feature of the text and the deep feature of the text and obtains the text feature corresponding to the video. In some embodiments, the server may alternatively choose not to cascade the wide feature of the text and the deep feature of the text, but may perform feature fusion in a manner such as obtaining a dot product or obtaining an average value, thereby shortening the duration of the feature fusion and reducing the calculation amount of the feature fusion process. Certainly, the server may alternatively perform feature fusion of the wide feature of the text and the deep feature of the text through bilinear pooling, thereby ensuring full interaction between features.

In the foregoing steps S408 to S411, the server inputs a text corresponding to the video to a third feature extraction network, performs feature extraction on the discrete text by using the third feature extraction network, and outputs a text feature corresponding to the video. Therefore, not only the image feature of the video, the audio feature of the video, and the user feature of the user can be considered, but also the function brought by the text type metadata of the video is not ignored. The text feature of the video is obtained after feature extraction is performed on the text, thereby increasing the diversity of feature types of the video recommendation process, and further improving the accuracy of the video recommendation process.

S412. The server performs bilinear pooling on the video feature and the user feature, and obtains a first associated feature.

The first associated feature is used for representing a feature association between the video and the user.

The foregoing step S412 and the foregoing step S403 are similar, the server may perform bilinear pooling in a manner such as MCB, MLB, or MFB, thereby ensuring full interaction between the video feature and the user feature on the basis of improving feature fusion efficiency, and details are not described herein again.

In the foregoing step S412, the server performs feature fusion on the video feature and the user feature, and obtains a first associated feature between the video and the user. In some embodiments, the server may alternatively choose not to perform bilinear pooling on the video feature and the user feature, but may perform feature fusion in a manner such as obtaining a dot product, obtaining an average value, or cascading, thereby further shortening the duration of the feature fusion, and reducing the calculation amount of the feature fusion process.

S413. The server performs bilinear pooling on the text feature and the user feature, and obtains a second associated feature.

The second associated feature is used for representing a feature association between the text and the user.

The foregoing step S413 and the foregoing step S403 are similar, the server may perform bilinear pooling in a manner such as MCB, MLB, or MFB, thereby ensuring full interaction between the video feature and the user feature on the basis of improving feature fusion efficiency, and details are not described herein again.

In the foregoing step S413, the server performs feature fusion on the text feature and the user feature, and obtains a second associated feature between the text and the user. In some embodiments, the server may alternatively choose not to perform bilinear pooling on the text feature and the user feature, but may perform feature fusion in a manner such as obtaining a dot product, obtaining an average value, or cascading, thereby further shortening the duration of the feature fusion, and reducing the calculation amount of the feature fusion process.

S414. The server performs dot multiplication on the first associated feature and the second associated feature, and obtains a recommendation probability of recommending the video to the user.

In the foregoing process, the server may perform dot multiplication on the first associated feature and the second associated feature, that is, calculate an inner product of the first associated feature and the second associated feature, where values in corresponding locations in the first associated feature and the second associated feature are multiplied. A value obtained by adding products is the recommendation probability of the video.

In the foregoing steps S412 to S414, the server performs feature fusion based on the video feature and the user feature, and obtains a recommendation probability of recommending the video to the user. Therefore, video recommendation can be performed for the user based on the recommendation probability. For details, reference is made to the following step S415.

In some embodiments, the server may alternatively choose not to perform the foregoing steps S408 to S414, that is, not obtain the text feature, but directly perform, after performing the foregoing step S407, a dot multiplication on the video feature and the user feature, and obtain a recommendation probability of recommending the video to the user, thereby avoiding a cumbersome calculation process of text feature obtaining and subsequent feature fusion, and reducing the duration of the recommended video.

S415. The server determines, in response to that the recommendation probability is greater than a probability threshold, to recommend the video to the user.

The probability threshold may be any value greater than or equal to 0 and less than or equal to 1.

In the foregoing process, the server compares values of the recommendation probability and the probability threshold, and determines, in response to that the recommendation probability is greater than the probability threshold, to recommend the video to the user. The server may determine, in response to that the recommendation probability is less than or equal to the probability threshold, not to recommend the video to the user.

In the foregoing step S415, the server determines, according to the recommendation probability, whether to recommend the video to the user. For each of different users and each of different videos, the server may perform the foregoing video recommendation process in the foregoing steps S401 to S415, thereby determining whether to recommend any video to any user.

In some embodiments, the server may alternatively choose not to determine, according to the probability threshold whether to perform recommendation, but perform the following steps: repeatedly performing, by the server, an operation of generating a recommendation probability on each of a plurality of videos, and obtaining a plurality of recommendation probabilities; obtaining probability ranks of all of the plurality of recommendation probabilities in descending order, and determining, in response to that a probability rank is less than or equal to a target threshold, to recommend at least one video corresponding to the probability rank to the user; and determining, in response to that a probability rank is greater than the target threshold, not to recommend a video corresponding to the probability rank to the user. The target threshold may be a value greater than or equal to 1 and less than or equal to a quantity of the plurality of videos.

In the foregoing process, by obtaining the probability ranks, the server can therefore control a quantity of selected recommended videos to avoid recommending an excessive quantity of videos to the user if the probability threshold is relatively small, thereby optimizing the video recommendation effect.

Certainly, after performing the foregoing step S415, the server may repeatedly perform the operations performed in the foregoing steps S401 to S415, and can therefore determine at least one recommended video recommended to the user, and transmit video information of the at least one recommended video to the terminal, thereby performing the terminal side display process similar to steps S206 to S210 in the foregoing embodiment. Details are not described herein.

Any combination of the foregoing optional technical solutions may be used to form an optional embodiment of the present disclosure. Details are not described herein again.

In the method provided in this embodiment of the present disclosure, a video is inputted to a first feature extraction network, feature extraction is performed on at least one consecutive video frame in the video by using the first feature extraction network, and a video feature of the video is outputted. Because video features are few in type and high in dimension, a high-dimensional video feature is targeted and extracted without adding an excessively large calculation pressure. User data of a user is inputted to a second feature extraction network, feature extraction is performed on the discrete user data by using the second feature extraction network, and a user feature of the user is outputted. Because user features are many in type and low in dimension, a low-dimensional user feature may be targeted and extracted based on the second feature extraction network, thereby reducing a calculation pressure of extracting the user feature. Feature fusion is performed based on the video feature and the user feature, and a recommendation probability of recommending the video to the user is obtained. Whether to recommend the video to the user is determined according to the recommendation probability, thereby performing feature extraction on the user feature and the video feature between which a property difference is relatively large by using different networks respectively, avoiding loss of information in the user feature and the video feature, alleviating the gradient vanishing problem, and improving video recommendation accuracy.

Further, the image feature of the video is extracted by using the TCN, and the causal convolution operation is introduced. Compared with the CNN framework, there is a causal relationship between layers of the TCN. Therefore, in a current layer, information about a correlation between image frames in a previous layer that have a time sequence association may be considered, so that each image frame feature in the output layer of the TCN may represent both an image feature of an image frame and an association between the image frame and an image frame before the image frame. Further, compared with a long short-term memory (LSTM) network framework that usually has a relatively good memory capability, because the LSTM includes a forget gate, it is unavoidable to miss some historical information during processing. However, because no forget gate needs to be set in the TCN, missing of historical information can be avoided. Moreover, as the TCN goes deeper, a feature map obtained after causal convolution may include information about each image frame of image data in the input layer.

Further, the audio feature of the video is extracted by using the CNN. If CNN network is a VGG network, as the VGG network goes deeper, the size of the image is halved and the depth is doubled after each time of pooling, thereby simplifying the structure of the CNN and helping to extract a high-level audio feature.

Further, because the image feature and the audio feature are usually relatively large in dimension, full interaction between the image feature and the audio feature can be ensured by performing bilinear pooling on the image feature and the audio feature on the basis of improving feature fusion efficiency.

Further, the user feature is extracted by using the second feature extraction network, thereby this implementation not only considers the memory capability of the second feature extraction network by using the wide component, but also considers the generalization capability of the second feature extraction network by using the deep component, so that the second feature extraction network can more accurately express the user feature of the user.

Further, the text feature of the video is obtained after feature extraction is performed on the text. Therefore, not only the image feature of the video, the audio feature of the video, and the user feature of the user can be considered, but also the function brought by the text type metadata of the video is not ignored, thereby increasing the diversity of feature types of the video recommendation process, and further improving the accuracy of the video recommendation process.

Further, the text feature is extracted by using the third feature extraction network, thereby not only considering the memory capability of the third feature extraction network by using the wide component, but also considering the generalization capability of the third feature extraction network by using the deep component, so that the third feature extraction network can more accurately express the text feature corresponding to the video.

Figure 8:
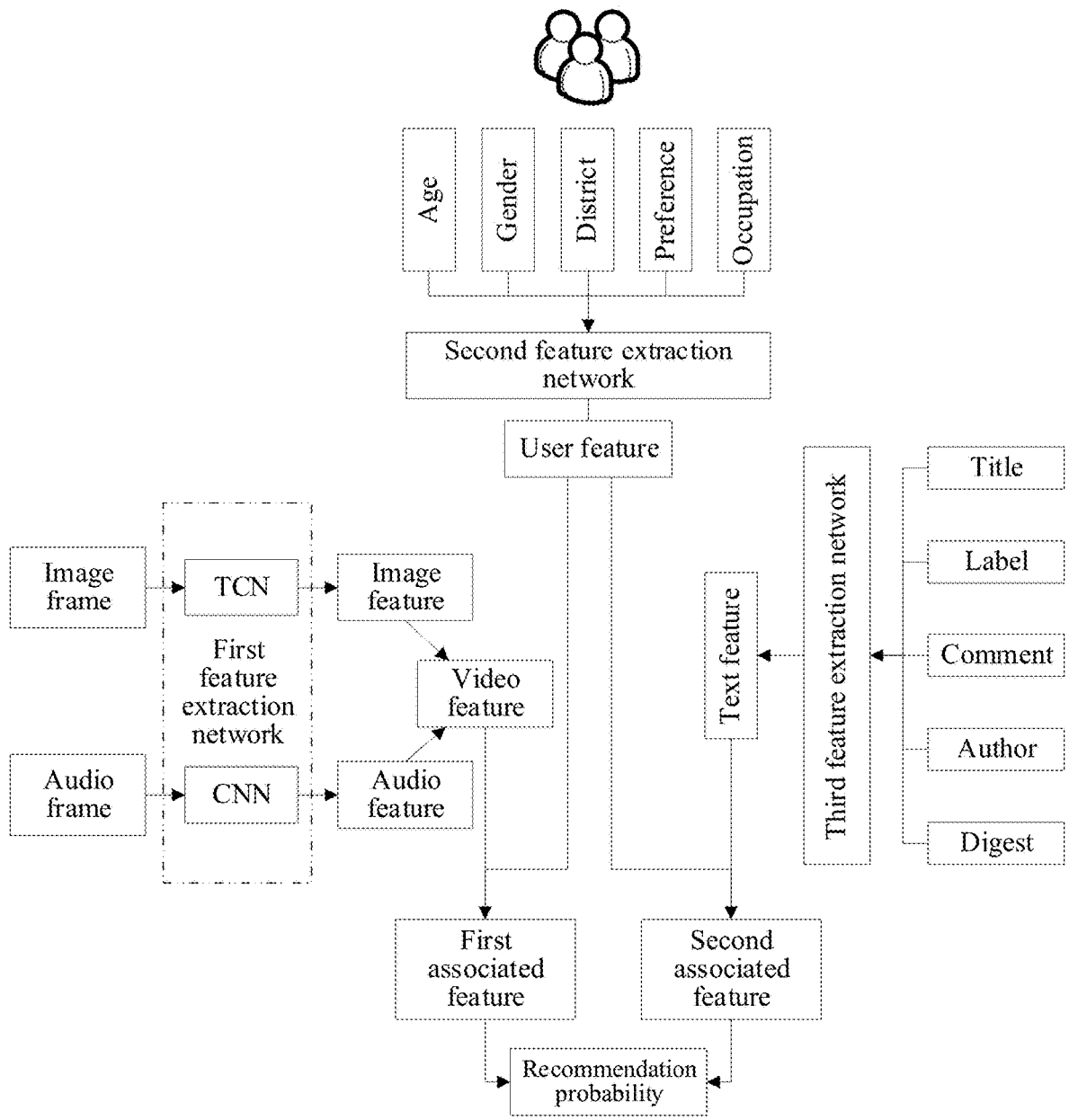
FIG. 8 is a schematic diagram of a video recommendation method according to an embodiment of the present disclosure.

In the foregoing embodiment, FIG. 8 is a schematic diagram of a video recommendation method according to an embodiment of the present disclosure. Referring to FIG. 8, the server extracts features with different properties by using networks in different architectures, that is, performs feature extraction on videos in different modes, user data, and texts corresponding to the videos respectively by using the first feature extraction network, the second feature extraction network, and the third feature extraction network, thereby reducing multi-modal fusion information loss, preventing a high-dimensional feature from squeezing the expression capability of a low-dimensional feature, and reducing dimension explosion caused by ineffective fusion. In another aspect, by newly introducing the text feature, the video watching preference and the text reading preference of the user may be respectively depicted from such two dimensions as the video feature and the text feature, thereby enhancing the description capability and interpretability of the server for multi-modal data.

In another aspect, the server respectively extracts the image feature of the video by using the TCN and extracts the audio feature of the video by using the CNN in the first feature extraction network, respectively extracts the wide feature of the user by using the wide component and extracts the deep feature of the user by using the deep component in the second feature extraction network, and respectively extracts the wide feature of the text by using the wide component and extracts the deep feature of the text by using the deep component in the third feature extraction network; further, the server first performs intra-class feature fusion on features in similar structures, that is, fuses the image feature and the audio feature of the video to obtain the video feature, fuses the wide feature of the user and the deep feature of the user to obtain the user feature, and fuses the wide feature of the text and the deep feature of the text to obtain the text feature, thereby reducing the feature dimension and improving the fusion efficiency. The server then performs inter-class fusion on features in dissimilar structures, for example, obtains the first joint feature and the second joint feature, so that dot multiplication can be performed on the two joint features based on the multi-modal video recommendation method to obtain the recommendation probability, the video feature and the text feature are fully used, and the video can be depicted from the perspective of more dimensions, that is, the video can be more accurately expressed, thereby improving the video recommendation accuracy.

In some embodiments, before performing video recommendation, the server may perform training based on a back propagation algorithm to obtain the first feature extraction network and separately obtain the second feature extraction network and the third feature extraction network based on a wide and deep joint training method to perform training. The training process and that in the foregoing embodiment are similar, but a sample video, sample user data, and a sample text are used, and details are not described herein again.

Figure 9:
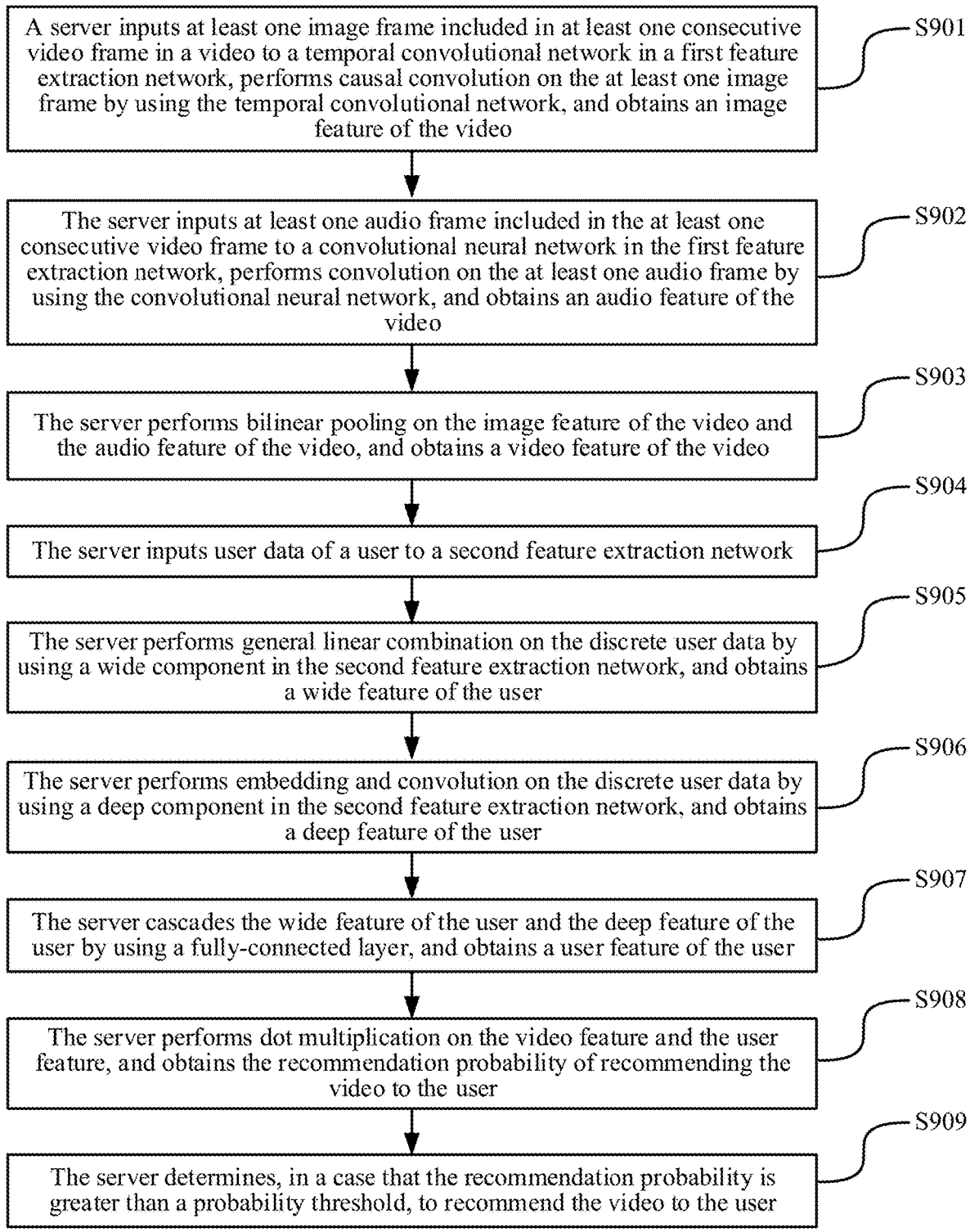
FIG. 9 is a flowchart of a video recommendation method according to an embodiment of the present disclosure.

The foregoing embodiment provides a method for performing video recommendation according to a video, user data, and a text. Exemplarily, description is made by using an example in which the computer device is a server, and the server may alternatively directly perform video recommendation according to a video and user data without introducing any text. FIG. 9 is a flowchart of a video recommendation method according to an embodiment of the present disclosure. Referring to FIG. 9, detailed description is made below:

S901. A server inputs at least one image frame included in the at least one consecutive video frame in the video to the temporal convolutional network in the first feature extraction network, performs causal convolution on the at least one image frame by using the temporal convolutional network, and obtains an image feature of the video.

The foregoing step S901 and step S401 in the foregoing embodiment are similar, and details are not described herein.

S902. The server inputs at least one audio frame included in the at least one consecutive video frame to a convolutional neural network in the first feature extraction network, performs convolution on the at least one audio frame by using the convolutional neural network, and obtains an audio feature of the video.

The foregoing step S902 and step S402 in the foregoing embodiment are similar, and details are not described herein.

S903. The server performs bilinear pooling on the image feature of the video and the audio feature of the video, and obtains a video feature of the video.

The foregoing step S903 and step S403 in the foregoing embodiment are similar, and details are not described herein.

S904. The server inputs user data of a user to a second feature extraction network.

The foregoing step S904 and step S404 in the foregoing embodiment are similar, and details are not described herein.

S905. The server performs general linear combination on the discrete user data by using a wide component in the second feature extraction network, and obtains a wide feature of the user.

The foregoing step S905 and step S405 in the foregoing embodiment are similar, and details are not described herein.

S906. The server performs embedding and convolution on the discrete user data by using a deep component in the second feature extraction network, and obtains a deep feature of the user.

The foregoing step S906 and step S406 in the foregoing embodiment are similar, and details are not described herein.

S907. The server cascades the wide feature of the user and the deep feature of the user by using a fully-connected layer, and obtains a user feature of the user.

The foregoing step S907 and step S407 in the foregoing embodiment are similar, and details are not described herein.

S908. The server performs dot multiplication on the video feature and the user feature, and obtains the recommendation probability of recommending the video to the user.

The dot multiplication manner in the foregoing step S908 and that in step S414 in the foregoing embodiment are similar, and details are not described herein.

S909. The server determines, in response to that the recommendation probability is greater than a probability threshold, to recommend the video to the user.

The foregoing step S909 and step S415 in the foregoing embodiment are similar, and details are not described herein.

Certainly, after performing the foregoing step S909, the server may repeatedly perform the operations performed in the foregoing steps S901 to S909, and can therefore determine at least one recommended video recommended to the user, and transmit video information of the at least one recommended video to the terminal, thereby performing the terminal side display process similar to steps S206 to S210 in the foregoing embodiment. Details are not described herein.

In the method provided in this embodiment of the present disclosure, a video is inputted to a first feature extraction network, feature extraction is performed on at least one consecutive video frame in the video by using the first feature extraction network, and a video feature of the video is outputted. Because video features are few in type and high in dimension, a high-dimensional video feature is targeted and extracted without adding an excessively large calculation pressure. User data of a user is inputted to a second feature extraction network, feature extraction is performed on the discrete user data by using the second feature extraction network, and a user feature of the user is outputted. Because user features are many in type and low in dimension, a low-dimensional user feature may be targeted and extracted based on the second feature extraction network, thereby reducing a calculation pressure of extracting the user feature. Feature fusion is performed based on the video feature and the user feature, and a recommendation probability of recommending the video to the user is obtained. Whether to recommend the video to the user is determined according to the recommendation probability, thereby performing feature extraction on the user feature and the video feature between which a property difference is relatively large by using different networks respectively, avoiding loss of information in the user feature and the video feature, alleviating the gradient vanishing problem, and improving video recommendation accuracy.

Figure 10:
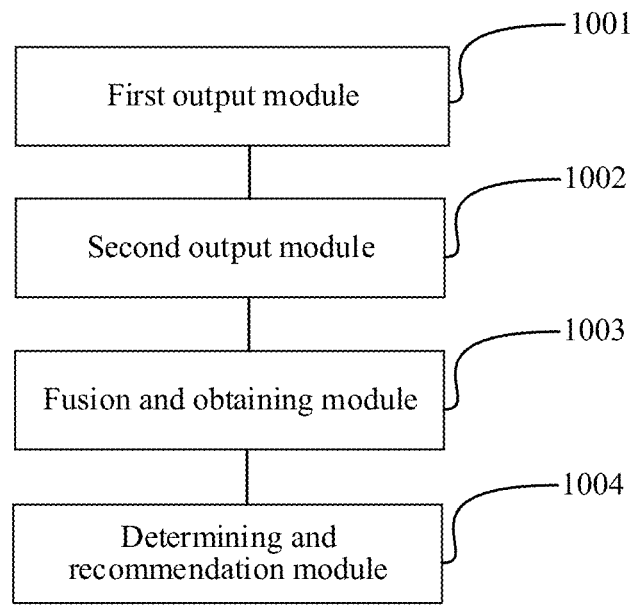
FIG. 10 is a schematic structural diagram of a video recommendation apparatus according to an embodiment of the present disclosure.

FIG. 10 is a schematic structural diagram of a video recommendation apparatus according to an embodiment of the present disclosure. Referring to FIG. 10, the apparatus includes a first output module 1001, a second output module 1002, a fusion and obtaining module 1003, and a determining and recommendation module 1004, and detailed description is made below:

The first output module 1001 is configured to input a video to a first feature extraction network, perform feature extraction on at least one consecutive video frame in the video by using the first feature extraction network, and output a video feature of the video.

The second output module 1002 is configured to input user data of a user to a second feature extraction network, perform feature extraction on the discrete user data by using the second feature extraction network, and output a user feature of the user.

The fusion and obtaining module 1003 is configured to perform feature fusion based on the video feature and the user feature, and obtain a recommendation probability of recommending the video to the user.

The determining and recommendation module 1004 is configured to determine, according to the recommendation probability, whether to recommend the video to the user.

Based on the apparatus provided in this embodiment of the present disclosure, a video is inputted to a first feature extraction network, feature extraction is performed on at least one consecutive video frame in the video by using the first feature extraction network, and a video feature of the video is outputted; because video features are few in type and high in dimension, a high-dimensional video feature is targeted and extracted without adding an excessively large calculation pressure; user data of a user is inputted to a second feature extraction network, feature extraction is performed on the discrete user data by using the second feature extraction network, and a user feature of the user is outputted; because user features are many in type and low in dimension, a low-dimensional user feature may be targeted and extracted based on the second feature extraction network, thereby reducing a calculation pressure of extracting the user feature; feature fusion is performed based on the video feature and the user feature, and a recommendation probability of recommending the video to the user is obtained; and whether to recommend the video to the user is determined according to the recommendation probability, thereby performing feature extraction on the user feature and the video feature between which a property difference is relatively large by using different networks respectively, avoiding loss of information in the user feature and the video feature, alleviating the gradient vanishing problem, and improving video recommendation accuracy.

In some embodiments, based on the apparatus composition of FIG. 10, the first output module 1001 includes:

a convolution and extraction unit, configured to separately input the at least one consecutive video frame in the video to a temporal convolutional network and a convolutional neural network in the first feature extraction network, perform convolution on the at least one consecutive video frame by using the temporal convolutional network and the convolutional neural network, and extract the video feature of the video.

In some embodiments, based on the apparatus composition of FIG. 10, the convolution and extraction unit includes:

a causal convolution subunit, configured to input at least one image frame included in the at least one consecutive video frame in the video to the temporal convolutional network in the first feature extraction network, perform causal convolution on the at least one image frame by using the temporal convolutional network, and obtain an image feature of the video;

a convolution subunit, configured to input at least one audio frame included in the at least one consecutive video frame to the convolutional neural network in the first feature extraction network, perform convolution on the at least one audio frame by using the convolutional neural network, and obtain an audio feature of the video; and a fusion subunit, configured to perform feature fusion on the image feature of the video and the audio feature of the video, and obtain the video feature of the video.

In some embodiments, the fusion subunit is configured to perform bilinear pooling on the image feature of the video and the audio feature of the video, and obtain the video feature of the video.

In some embodiments, based on the apparatus composition of FIG. 10, the second output module 1002 includes:

a first input unit, configured to input the user data of the user to the second feature extraction network;

a first linear combination unit, configured to perform general linear combination on the discrete user data by using a wide component in the second feature extraction network, and obtain a wide feature of the user;

a first embedding and convolution unit, configured to perform embedding and convolution on the discrete user data by using a deep component in the second feature extraction network, and obtain a deep feature of the user; and a first fusion unit, configured to perform feature fusion on the wide feature of the user and the deep feature of the user, and obtain the user feature of the user.

In some embodiments, the first fusion unit is specifically configured to cascade the wide feature of the user and the deep feature of the user by using a fully-connected layer, and obtain the user feature of the user.

In some embodiments, the fusion and obtaining module 1003 is configured to perform dot multiplication on the video feature and the user feature, and obtain the recommendation probability of recommending the video to the user.

In some embodiments, based on the apparatus composition of FIG. 10, the apparatus further includes:

a third input module, configured to input a text corresponding to the video to a third feature extraction network, perform feature extraction on the discrete text by using the third feature extraction network, and output a text feature corresponding to the video.

In some embodiments, based on the apparatus composition of FIG. 10, the third input module includes:

a second input unit, configured to input the text to the third feature extraction network;

a second linear combination unit, configured to perform general linear combination on the discrete text by using a wide component in the third feature extraction network, and obtain a wide feature of the text;

a second embedding and convolution unit, configured to perform embedding and convolution on the discrete text by using a deep component in the third feature extraction network, and obtain a deep feature of the text; and a second fusion unit, configured to perform feature fusion on the wide feature of the text and the deep feature of the text, and obtain the text feature corresponding to the video.

In some embodiments, the second fusion unit is specifically configured to cascade the wide feature of the text and the deep feature of the text by using a fully-connected layer, and obtain the text feature corresponding to the video.

In some embodiments, based on the apparatus composition of FIG. 10, the fusion and obtaining module 1003 includes:

a third fusion unit, configured to perform feature fusion on the video feature and the user feature, and obtain a first associated feature between the video and the user;

the third fusion unit being further configured to perform feature fusion on the text feature and the user feature, and obtain a second associated feature between the text and the user; and a dot multiplication unit, configured to perform dot multiplication on the first associated feature and the second associated feature, and obtain the recommendation probability of recommending the video to the user.

In some embodiments, the third fusion unit is specifically configured to perform bilinear pooling on the video feature and the user feature, and obtains the first associated feature.

The third fusion unit is further configured to perform bilinear pooling on the text feature and the user feature, and obtain the second associated feature.

In some embodiments, the determining and recommendation module 1004 is configured to: determine, in response to the recommendation probability is greater than a probability threshold, to recommend the video to the user; and determine, in response to that the recommendation probability is less than or equal to the probability threshold, not to recommend the video to the user.

In some embodiments, the determining and recommendation module 1004 is configured to: repeatedly perform an operation of generating a recommendation probability on each of two or more videos, and obtain two or more recommendation probabilities; obtain probability ranks of all of the two or more recommendation probabilities in descending order, and determine, in response to that a probability rank is less than or equal to a target threshold, to recommend a video corresponding to the corresponding probability rank to the user; and determine, in response to that a probability rank is greater than the target threshold, not to recommend a video corresponding to the corresponding probability rank to the user.

Any combination of the foregoing optional technical solutions may be used to form an optional embodiment of the present disclosure. Details are not described herein again.

When the video recommendation apparatus provided in the foregoing embodiments recommends a video, the division of the foregoing functional modules is merely an example for description. In the practical application, the functions may be assigned to and completed by different functional modules according to the requirements, that is, the internal structure of the computer device is divided into different functional modules, to implement all or some of the functions described above. Moreover, the embodiments of the video recommendation apparatus provided in the foregoing embodiments belong to the same concept as that of the embodiments of the video recommendation method. For details of a specific implementation process thereof, refer to the embodiments of the video recommendation method. Details are not described herein again.

Figure 11:
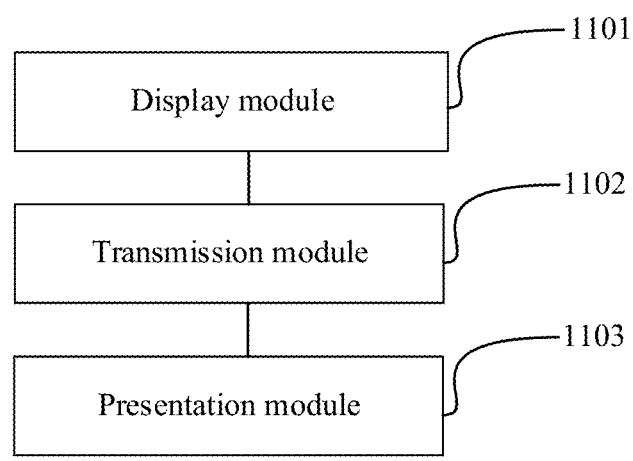
FIG. 11 is a schematic structural diagram of a recommended video presentation apparatus according to an embodiment of the present disclosure.

FIG. 11 is a schematic structural diagram of a recommended video presentation apparatus according to an embodiment of the present disclosure. Referring to FIG. 11, the apparatus includes a display module 1101, a transmission module 1102, and a presentation module 1103, and detailed description is made below:

The display module 1101 is configured to display a video presentation interface, the video presentation interface including at least one first recommended video.

The transmission module 1102 is configured to transmit, in response to that a click/tap operation on any first recommended video is detected, a watching record of the first recommended video to a server in response to the click/tap operation, the watching record being used for instructing the server to optimize and train a video recommendation model based on the watching record and return video information of at least one second recommended video in real time.

The presentation module 1103 is configured to present, in response to that the video information of at least one second recommended video is received, the at least one second recommended video in the video presentation interface based on the video information of the at least one second recommended video.

Based on the apparatus provided in this embodiment of the present disclosure, at least one first recommended video is presented on the video presentation interface, and in response to that a click/tap operation of a user on any first recommended video is detected, a watching record of the recommended video is transmitted to a server in response to the click/tap operation, thereby feeding back quality of the current first recommended video to the user in time, so that the server can differentiate and label true and false samples of the first recommended video based on the watching record, and take the first recommended video as a sample video in a new round of optimization and training, to dynamically optimize and train the video recommendation model; and the server may further return video information of at least one second recommended video to the terminal according to the optimized and trained video recommendation model, and after the terminal receives the video information of the at least one second recommended video, the at least one second recommended video is presented in the video presentation interface based on the video information of the at least one second recommended video. Therefore, with the click/tap operation of the user, a recommended video with higher recommendation accuracy can be updated and presented in real time on the video presentation interface.

When the recommended video presentation apparatus provided in the foregoing embodiments presents a recommended video, the division of the foregoing functional modules is merely an example for description. In the practical application, the functions may be assigned to and completed by different functional modules according to the requirements, that is, the internal structure of the electronic device is divided into different functional modules, to implement all or some of the functions described above. Moreover, the embodiments of the recommended video presentation apparatus provided in the foregoing embodiments belong to the same concept as that of the interaction embodiments of the video recommendation method. For details of a specific implementation process thereof, refer to the embodiments of the video recommendation method. Details are not described herein again.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

Figure 12:
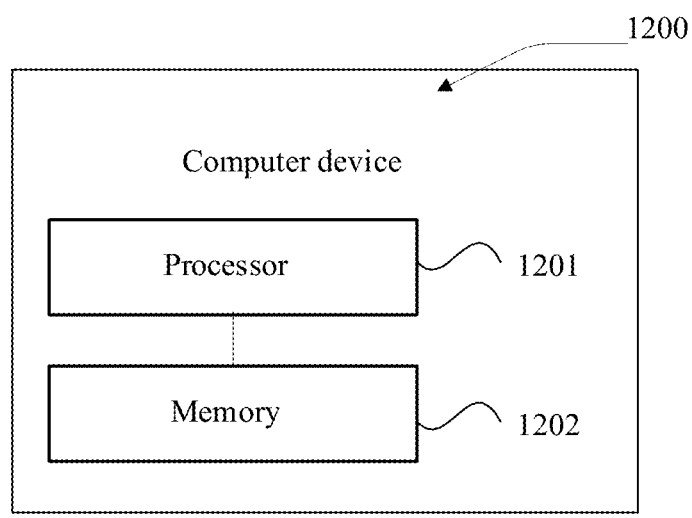
FIG. 12 is a schematic structural diagram of a computer device according to an embodiment of the present disclosure.

FIG. 12 is a schematic structural diagram of a computer device according to an embodiment of the present disclosure. The computer device 1200 may vary greatly due to different configurations or performance, and may include one or more processors (CPUs) 1201 and one or more memories 1202. The memory 1202 stores at least one computer-readable instruction, the at least one computer-readable instruction being loaded and executed by the processor 1201 to implement the video recommendation method provided in the foregoing video recommendation method embodiments. Certainly, the computer device may further have components such as a wired or wireless network interface, a keyboard, and an input/output interface for ease of input/output, and may further include other components for implementing functions of the device. Details are not provided herein.

Figure 13:
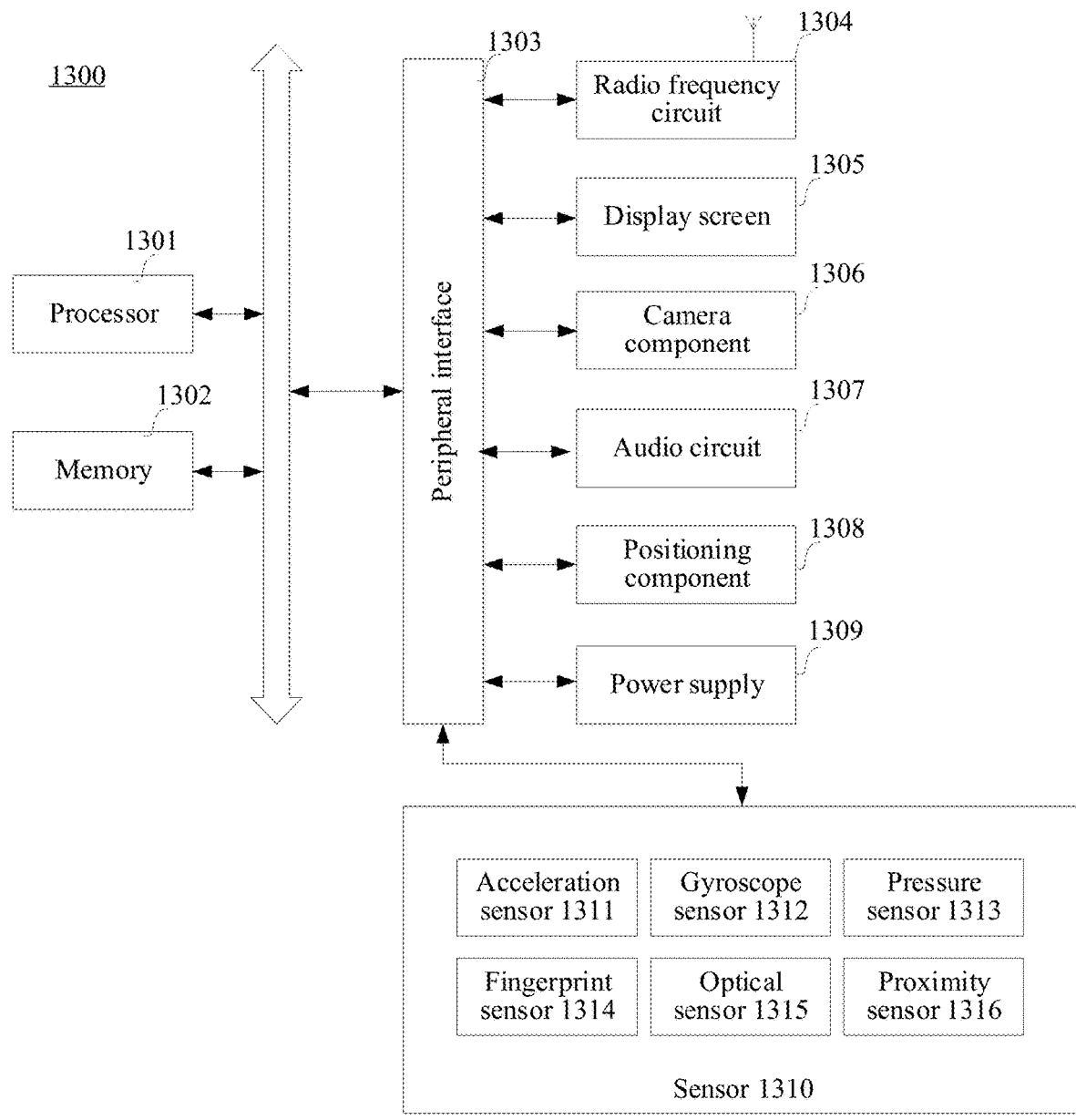
FIG. 13 is a schematic structural diagram of an electronic device, according to an embodiment of the present disclosure.

FIG. 13 is a schematic structural diagram of an electronic device, according to an embodiment of the present disclosure. The electronic device 1300 may be a smartphone, a tablet computer, an MP3 player, an MP4 player, a notebook computer, or a desktop computer. The electronic device 1300 may alternatively be referred to as other names such as user equipment, a portable electronic device, a laptop electronic device, and a desktop electronic device.

Generally, the electronic device 1300 includes a processor 1301 and a memory 1302.

The processor 1301 may include one or more processing cores, and may be, for example, a 4-core processor or an 8-core processor. The processor 1301 may be implemented in at least one hardware form of a digital signal processor (DSP), a field-programmable gate array (FPGA), and a programmable logic array (PLA). The processor 1301 may alternatively include a main processor and a coprocessor. The main processor is a processor configured to process data in an awake state, and is also referred to as a central processing unit (CPU). The coprocessor is a low power consumption processor configured to process the data in a standby state. In some embodiments, the processor 1301 may be integrated with a graphics processing unit (GPU). The GPU is configured to be responsible for rendering and drawing content that a display screen needs to display. In some embodiments, the processor 1301 may further include an artificial intelligence (AI) processor. The AI processor is configured to process a computing operation related to machine learning.

The memory 1302 may include one or more computer-readable storage media that may be non-transitory. The memory 1302 may further include a high-speed random access memory, and a non-volatile memory such as one or more magnetic disk storage devices and a flash storage device. In some embodiments, the non-transient computer-readable storage medium in the memory 1302 is configured to store at least one computer-readable instruction, and the at least one computer-readable instruction is configured to be executed by the processor 1301 to implement the recommended video presentation method provided in the method embodiments of this disclosure.

In some embodiments, the electronic device 1300 may further exemplarily include a peripheral interface 1303 and at least one peripheral. The processor 1301, the memory 1302, and the peripheral interface 1303 may be connected by using a bus or a signal cable. Each peripheral may be connected to the peripheral interface 1303 by using a bus, a signal cable, or a circuit board. Specifically, the peripheral includes: at least one of a radio frequency (RF) circuit 1304, a touch display screen 1305, a camera component 1306, an audio circuit 1307, a positioning component 1308, and a power supply 1309.

The peripheral interface 1303 may be configured to connect the at least one peripheral related to input/output (I/O) to the processor 1301 and the memory 1302. In some embodiments, the processor 1301, the memory 1302, and the peripheral interface 1303 are integrated on the same chip or the same circuit board. In some other embodiments, any one or two of the processor 1301, the memory 1302, and the peripheral interface 1303 may be implemented on an independent chip or circuit board. This is not limited in this embodiment.

The RF circuit 1304 is configured to receive and transmit an RF signal, which is also referred to as an electromagnetic signal. The RF circuit 1304 communicates with a communication network and other communication devices by using the electromagnetic signal. The RF circuit 1304 converts an electric signal into an electromagnetic signal for transmission, or converts a received electromagnetic signal into an electric signal. Exemplarily, the RF circuit 1304 includes: an antenna system, an RF transceiver, one or more amplifiers, a tuner, an oscillator, a digital signal processor, a codec chip set, a subscriber identity module card, and the like. The RF circuit 1304 may communicate with other electronic devices through at least one wireless communication protocol. The wireless communication protocol includes, but is not limited to, a metropolitan area network, generations of mobile communication networks (2G, 3G, 4G, and 5G), a wireless local area network, and/or a wireless fidelity (Wi-Fi) network. In some embodiments, the RF circuit 1304 may further include a circuit related to near field communication (NFC). This is not limited in this disclosure.

The display screen 1305 is configured to display a user interface (UI). The UI may include a graph, text, an icon, a video, and any combination thereof. When the display screen 1305 is a touch display screen, the display screen 1305 is further capable of collecting a touch signal on or above a surface of the display screen 1305. The touch signal may be inputted to the processor 1301 as a control signal for processing. In this case, the display screen 1305 may be further configured to provide a virtual button and/or a virtual keyboard that are/is also referred to as a soft button and/or a soft keyboard. In some embodiments, there may be one display screen 1305 disposed on a front panel of the electronic device 1300. In some other embodiments, there may be at least two display screens 1305, disposed on different surfaces of the electronic device 1300 respectively or in a folded design. In still other embodiments, the display screen 1305 may be a flexible display screen disposed on a curved surface or a folded surface of the electronic device 1300. Even, the display screen 1305 may be further set to have a non-rectangular irregular pattern, that is, a special-shaped screen. The display screen 1305 may be prepared by using materials such as a liquid crystal display (LCD), an organic light-emitting diode (OLED), or the like.

The camera component 1306 is configured to capture images or videos. Exemplarily, the camera component 1306 includes a front-facing camera and a rear-facing camera. Generally, the front-facing camera is disposed in the front panel of the electronic device, and the rear-facing camera is disposed in the rear of the electronic device. In some embodiments, there are at least two rear cameras, which are respectively any of a main camera, a depth-of-field camera, a wide-angle camera, and a telephoto camera, to achieve background blur through fusion of the main camera and the depth-of-field camera, panoramic photographing and virtual reality (VR) photographing through fusion of the main camera and the wide-angle camera, or other fusion photographing functions. In some embodiments, the camera component 1306 may further include a flash. The flash may be a monochrome temperature flash, or may be a double color temperature flash. The double color temperature flash refers to a combination of a warm light flash and a cold light flash, and may be used for light compensation under different color temperatures.

The audio circuit 1307 may include a microphone and a speaker. The microphone is configured to collect sound waves of users and surroundings, and convert the sound waves into electrical signals and input the signals to the processor 1301 for processing, or input the signals to the RF circuit 1304 to implement voice communication. For the purpose of stereo sound collection or noise reduction, there may be a plurality of microphones, respectively disposed at different parts of the electronic device 1300. The microphone may further be an array microphone or an omnidirectional collection type microphone. The speaker is configured to convert electrical signals from the processor 1301 or the RF circuit 1304 into acoustic waves. The speaker may be a conventional film speaker, or may be a piezoelectric ceramic speaker. When the speaker is the piezoelectric ceramic speaker, the speaker not only can convert an electric signal into acoustic waves audible to a human being, but also can convert an electric signal into acoustic waves inaudible to a human being, for ranging and other purposes. In some embodiments, the audio circuit 1307 may further include an earphone jack.

The positioning component 1308 is configured to position a current geographic location of the electronic device 1300, to implement a navigation or a location based service (LBS). The positioning component 1308 may be a positioning component based on the Global Positioning System (GPS) of the United States, the BeiDou system of China, the GLONASS System of Russia, or the GALILEO System of the European Union.

The power supply 1309 is configured to supply power to components in the electronic device 1300. The power supply 1309 may be an alternating current, a direct current, a disposable battery, or a rechargeable battery. When the power supply 1309 includes the rechargeable battery, the rechargeable battery may be a wired rechargeable battery or a wireless rechargeable battery. The rechargeable battery may be further configured to support a fast charging technology.

In some embodiments, the electronic device 1300 may further include one or more sensors 1310. The one or more sensors 1310 include, but are not limited to, an acceleration sensor 1311, a gyroscope sensor 1312, a pressure sensor 1313, a fingerprint sensor 1314, an optical sensor 1315, and a proximity sensor 1316.

The acceleration sensor 1311 may detect acceleration on three coordinate axes of a coordinate system established by the electronic device 1300. For example, the acceleration sensor 1311 may be configured to detect components of gravity acceleration on the three coordinate axes. The processor 1301 may control, according to a gravity acceleration signal collected by the acceleration sensor 1311, the touch display screen 1305 to display the UI in a landscape view or a portrait view. The acceleration sensor 1311 may be further configured to collect motion data of a game or a user.

The gyroscope sensor 1312 may detect a body direction and a rotation angle of the electronic device 1300. The gyroscope sensor 1312 may cooperate with the acceleration sensor 1311 to collect a 3D action by the user on the electronic device 1300. The processor 1301 may implement the following functions according to the data collected by the gyroscope sensor 1312: motion sensing (such as changing the UI according to a tilt operation of the user), image stabilization at shooting, game control, and inertial navigation.

The pressure sensor 1313 may be disposed on a side frame of the electronic device 1300 and/or a lower layer of the touch display screen 1305. If the pressure sensor 1313 is disposed at the side frame of the electronic device 1300, a holding signal of the user on the electronic device 1300 may be detected, and left/right hand identification or a quick action may be performed by the processor 1301 according to the holding signal collected by the pressure sensor 1313. When the pressure sensor 1313 is disposed on the low layer of the touch display screen 1305, the processor 1301 controls, according to a pressure operation of the user on the touch display screen 1305, an operable control on the UI. The operable control includes at least one of a button control, a scroll-bar control, an icon control, and a menu control.

The fingerprint sensor 1314 is configured to collect a fingerprint of a user, and the processor 1301 recognizes an identity of the user according to the fingerprint collected by the fingerprint sensor 1314, or the fingerprint sensor 1314 recognizes the identity of the user based on the collected fingerprint. When the identity of the user is identified as a trusted identity, the processor 1301 authorizes the user to perform a related sensitive operation. The sensitive operation includes unlocking a screen, viewing encrypted information, downloading software, payment, changing settings, and the like. The fingerprint sensor 1314 may be disposed on a front face, a back face, or a side face of the electronic device 1300. If a physical button or a vendor logo is disposed on the electronic device 1300, the fingerprint sensor 1314 may be integrated together with the physical button or the vendor logo.

The optical sensor 1315 is configured to collect ambient light intensity. In an embodiment, the processor 1301 may control display brightness of the touch display screen 1305 according to the ambient light intensity collected by the optical sensor 1315. Specifically, when the ambient light intensity is relatively high, the display luminance of the touch display screen 1305 is increased. When the ambient light intensity is relatively low, the display luminance of the touch display screen 1305 is reduced. In another embodiment, the processor 1301 may further dynamically adjust a camera parameter of the camera component 1306 according to the ambient light intensity collected by the optical sensor 1315.

The proximity sensor 1316, also referred to as a distance sensor, is usually disposed on the front panel of the electronic device 1300. The proximity sensor 1316 is configured to collect a distance between a front face of the user and the front face of the electronic device 1300. In an embodiment, when the proximity sensor 1316 detects that the distance between the user and the front surface of the electronic device 1300 becomes smaller, the touch display screen 1305 is controlled by the processor 1301 to switch from a screen-on state to a screen-off state. When the proximity sensor 1316 detects that the distance between the user and the front surface of the electronic device 1300 becomes larger, the touch display screen 1305 is controlled by the processor 1301 to switch from the screen-off state to the screen-on state.

A person skilled in the art may understand that a structure shown in FIG. 13 constitutes no limitation on the electronic device 1300, and the electronic device may include more or fewer components than those shown in the figure, or some components may be combined, or a different component deployment may be used.

In an exemplary embodiment, a non-volatile computer-readable storage medium is further provided, storing computer-readable instructions, the computer-readable instructions, when executed by one or more processors, causing the one or more processors to perform operations of the video recommendation method described above, or operations of the recommended video presentation method described above. For example, the computer-readable storage medium may be a ROM, a random access memory (RAM), a CD-ROM, a magnetic tape, a floppy disk, or an optical data storage device.

Persons of ordinary skill in the art may understand that all or some of the steps of the foregoing embodiments may be implemented by using hardware, or may be implemented by a program instructing relevant hardware. The program may be stored in a computer-readable storage medium. The aforementioned storage medium may be a read-only memory, a magnetic disk, an optical disc, or the like.

The foregoing descriptions are merely exemplary embodiments of the present disclosure and are not intended to limit the present disclosure. Any modification, equivalent replacement, and improvement made without departing from the spirit and principle of the present disclosure shall fall within the protection scope of the present disclosure.

What is claimed is:

1. A video recommendation method, performed by a computer device, the method comprising:
   inputting a video to a first feature extraction network;
   performing video feature extraction on at least one consecutive video frame in the video with the first feature extraction network to generate a video feature of the video;
   inputting user data of a user to a second feature extraction network;
   performing user feature extraction on the user data with the second feature extraction network to generate a user feature of the user, the user data being discrete;
   inputting at least one text corresponding to the video to a third feature extraction network;
   performing text feature extraction on the at least one text with the third feature extraction network to generate a text feature of the video, the at least one text being discrete;
   performing first feature fusion based at least on the video feature and the user feature to obtain a first recommendation probability of recommending the video to the user by:
      performing video-user feature fusion on the video feature and the user feature to obtain a first associated feature between the video and the user;
      performing text-user feature fusion on the text feature and the user feature to obtain a second associated feature between the at least one text and the user; and
      performing dot multiplication on the first associated feature and the second associated feature to obtain the first recommendation probability of recommending the video to the user; and
   determining, according to the first recommendation probability, whether to recommend the video to the user.

2. The method according to claim 1, wherein inputting the video to the first feature extraction network comprises:
   separately inputting the at least one consecutive video frame in the video to a temporal convolutional network and a convolutional neural network in the first feature extraction network,
   wherein performing the video feature extraction on the at least one consecutive video frame in the video with the first feature extraction network to generate the video feature of the video comprises:
      extracting the video feature of the video through performing first convolution on the at least one consecutive video frame by using the temporal convolutional network and the convolutional neural network.

3. The method according to claim 2, wherein performing the first convolution on the at least one consecutive video frame by using the temporal convolutional network and the convolutional neural network to generate the video feature of the video comprises:
   performing causal convolution on at least one image frame in the at least one consecutive video frame using the temporal convolutional network to obtain an image feature of the video;
   performing audio convolution on at least one audio frame in the at least one consecutive video frame using the convolutional neural network to obtain an audio feature of the video; and
   performing second feature fusion on the image feature of the video and the audio feature of the video to obtain the video feature of the video.

4. The method according to claim 3, wherein performing the second feature fusion on the image feature and the audio feature to obtain the video feature comprises:
   performing bilinear pooling on the image feature and the audio feature to obtain the video feature.

5. The method according to claim 1, wherein performing the user feature extraction on the user data with the second feature extraction network comprises:
   performing general linear combination on the user data by using a wide component in the second feature extraction network to obtain a wide feature of the user;
   performing embedding and third convolution on the user data by using a deep component in the second feature extraction network to obtain a deep feature of the user; and
   performing third feature fusion on the wide feature of the user and the deep feature of the user to obtain the user feature of the user.

6. The method according to claim 5, wherein performing the third feature fusion on the wide feature of the user and the deep feature of the user to obtain the user feature of the user comprises:
   cascading the wide feature of the user and the deep feature of the user by using a fully-connected layer to obtain the user feature of the user.

7. The method according to claim 1, wherein performing the first feature fusion based at least on the video feature and the user feature to obtain the first recommendation probability of recommending the video to the user comprises:
   performing dot multiplication on the video feature and the user feature to obtain the first recommendation probability of recommending the video to the user.

8. The method according to claim 1, wherein performing the text feature extraction on the at least one text with the third feature extraction network, comprises:
   performing general linear combination on the at least one text by using a wide component in the third feature extraction network to obtain a wide feature of the at least one text;
   performing embedding and fourth convolution on the at least one text by using a deep component in the third feature extraction network to obtain a deep feature of the at least one text; and
   performing fourth feature fusion on the wide feature of the at least one text and the deep feature of the at least one text to obtain the text feature of the video.

9. The method according to claim 8, wherein the performing the fourth feature fusion on the wide feature of the at least one text and the deep feature of the at least one text to obtain the text feature of the video comprises:
   cascading the wide feature of the at least one text and the deep feature of the at least one text by using a fully-connected layer to obtain the text feature of the video.

10. The method according to claim 1:
wherein performing the video-user feature fusion on the video feature and the user feature to obtain the first associated feature between the video and the user comprises performing video-user bilinear pooling on the video feature and the user feature to obtain the first associated feature between the video and the user; and
wherein performing the text-user feature fusion on the text feature and the user feature to obtain the second associated feature between the text and the user comprises performing text-user bilinear pooling on the text feature and the user feature to obtain the second associated feature between the text and the user.

11. The method according to claim 1, wherein determining, according to the first recommendation probability, whether to recommend the video to the user comprises:
determining, when first the recommendation probability is greater than a probability threshold, to recommend the video to the user; and
determining, when the first recommendation probability is less than or equal to the probability threshold, not to recommend the video to the user.

12. The method according to claim 1, further comprises:
obtaining two or more extra recommendation probabilities respectively for two or more extra videos;
obtaining probability ranking of the extra two or more recommendation probabilities and the first recommendation probability; and
determining whether to recommend a certain video according to the ranking.

13. A server system, comprising at least one processor and memory, the at least one memory storing computer-readable instructions, wherein the at least one processor is configured to execute the computer-readable instructions to perform steps comprising:
inputting a video to a first feature extraction network;
performing video feature extraction on at least one consecutive video frame in the video with the first feature extraction network to generate a video feature of the video;
inputting user data of a user to a second feature extraction network;
performing user feature extraction on the user data with the second feature extraction network to generate a user feature of the user, the user data being discrete;
inputting at least one text corresponding to the video to a third feature extraction network;
performing text feature extraction on the at least one text with the third feature extraction network to generate a text feature of the video, the at least one text being discrete;
performing first feature fusion based at least on the video feature and the user feature to obtain a first recommendation probability of recommending the video to the user by:
performing video-user feature fusion on the video feature and the user feature to obtain a first associated feature between the video and the user;
performing text-user feature fusion on the text feature and the user feature to obtain a second associated feature between the at least one text and the user; and
performing dot multiplication on the first associated feature and the second associated feature to obtain the first recommendation probability of recommending the video to the user; and
determining, according to the first recommendation probability, whether to recommend the video to the user.

14. A non-transitory computer-readable storage medium, storing computer-readable instructions, the computer-readable instructions being configured to, when executed by one or more processors, cause the one or more processors to perform steps comprising:
inputting a video to a first feature extraction network;
performing video feature extraction on at least one consecutive video frame in the video with the first feature extraction network to generate a video feature of the video;
inputting user data of a user to a second feature extraction network;
performing user feature extraction on the user data with the second feature extraction network to generate a user feature of the user, the user data being discrete;
inputting at least one text corresponding to the video to a third feature extraction network;
performing text feature extraction on the at least one text with the third feature extraction network to generate a text feature of the video, the at least one text being discrete;
performing first feature fusion based at least on the video feature and the user feature to obtain a first recommendation probability of recommending the video to the user by:
performing video-user feature fusion on the video feature and the user feature to obtain a first associated feature between the video and the user;
performing text-user feature fusion on the text feature and the user feature to obtain a second associated feature between the at least one text and the user; and
performing dot multiplication on the first associated feature and the second associated feature to obtain the first recommendation probability of recommending the video to the user; and
determining, according to the first recommendation probability, whether to recommend the video to the user.

15. The server system according to claim 13, wherein the at least one processor is configured to execute the computer-readable instructions to input the video to the first feature extraction network by separately inputting the at least one consecutive video frame in the video to a temporal convolutional network and a convolutional neural network in the first feature extraction network; and
the at least one processor is configured to execute the computer-readable instructions to perform the video feature extraction on the at least one consecutive video frame in the video with the first feature extraction network to generate the video feature of the video by extracting the video feature of the video through performing first convolution on the at least one consecutive video frame by using the temporal convolutional network and the convolutional neural network.

16. The server system according to claim 13, wherein the at least one processor is configured to execute the computer-readable instructions to perform the user feature extraction on the user data with the second feature extraction network by:
performing general linear combination on the user data by using a wide component in the second feature extraction network to obtain a wide feature of the user;
performing embedding and third convolution on the user data by using a deep component in the second feature extraction network to obtain a deep feature of the user; and performing third feature fusion on the wide feature of the user and the deep feature of the user to obtain the user feature of the user.

17. The non-transitory computer-readable storage medium according to claim 14, wherein the computer-readable instructions is configured to, when executed by one or more processors, cause the one or more processors to input the video to the first feature extraction network by separately inputting the at least one consecutive video frame in the video to a temporal convolutional network and a convolutional neural network in the first feature extraction network; and the computer-readable instructions is configured to, when executed by one or more processors, cause the one or more processors to perform the video feature extraction on the at least one consecutive video frame in the video with the first feature extraction network to generate the video feature of the video by extracting the video feature of the video through performing first convolution on the at least one consecutive video frame by using the temporal convolutional network and the convolutional neural network.

18. The non-transitory computer-readable storage medium according to claim 14, wherein the computer-readable instructions is configured to, when executed by one or more processors, cause the one or more processors to perform the user feature extraction on the user data with the second feature extraction network by:

performing general linear combination on the user data by using a wide component in the second feature extraction network to obtain a wide feature of the user;

performing embedding and third convolution on the user data by using a deep component in the second feature extraction network to obtain a deep feature of the user; and performing third feature fusion on the wide feature of the user and the deep feature of the user to obtain the user feature of the user.

19. The server system according to claim 13, wherein the at least one processor is configured to execute the computer-readable instructions to determine, according to the first recommendation probability, whether to recommend the video to the user by:

determining, when first the recommendation probability is greater than a probability threshold, to recommend the video to the user; and determining, when the first recommendation probability is less than or equal to the probability threshold, not to recommend the video to the user.

20. The non-transitory computer-readable storage medium according to claim 14, wherein the computer-readable instructions is configured to, when executed by one or more processors, cause the one or more processors to determine, according to the first recommendation probability, whether to recommend the video to the user by:

determining, when first the recommendation probability is greater than a probability threshold, to recommend the video to the user; and determining, when the first recommendation probability is less than or equal to the probability threshold, not to recommend the video to the user.

* * * * *